US007783082B2

United States Patent
Koshizen et al.

(10) Patent No.: US 7,783,082 B2
(45) Date of Patent: Aug. 24, 2010

(54) SYSTEM AND METHOD FOR FACE RECOGNITION

(75) Inventors: Takamasa Koshizen, Wako (JP); Bernd Heisele, Cambridge, MA (US); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 10/561,256

(22) PCT Filed: Jun. 30, 2004

(86) PCT No.: PCT/IB2004/003274

§ 371 (c)(1),
(2), (4) Date: Jul. 25, 2006

(87) PCT Pub. No.: WO2005/001750

PCT Pub. Date: Jan. 6, 2005

(65) Prior Publication Data

US 2006/0280341 A1 Dec. 14, 2006

Related U.S. Application Data

(60) Provisional application No. 60/484,201, filed on Jun. 30, 2003.

(51) Int. Cl.
*G06K 9/00* (2006.01)

(52) U.S. Cl. .................. 382/118; 382/115; 382/116; 382/155; 382/159

(58) Field of Classification Search .............. 382/118, 382/155–161
See application file for complete search history.

(56) References Cited

U.S. PATENT DOCUMENTS

| 5,497,430 A | 3/1996 | Sadovnik et al. |
| 5,850,470 A * | 12/1998 | Kung et al. ............ 382/157 |

(Continued)

FOREIGN PATENT DOCUMENTS

| JP | 03-226874 | 10/1991 |
| JP | 04-175964 | 6/1992 |
| JP | 04-264985 | 9/1992 |
| JP | 07-065165 A | 3/1995 |
| JP | 10-232938 | 9/1998 |
| JP | 2001-118068 | 4/2001 |

(Continued)

OTHER PUBLICATIONS

Bernd Heisele, Purdy Ho, and Tomaso Poggio, "Face Recognition with Support Vector Machines: Global versus Component-Based Approach", Proceedings 8th Internation Conference on Computer Vision vol. 2, pp. 688-694, Vancouver 2001.*

(Continued)

*Primary Examiner*—Matthew C Bella
*Assistant Examiner*—Eric Rush
(74) *Attorney, Agent, or Firm*—Fenwick & West LLP; Mark E. Duell

(57) ABSTRACT

A face recognition system includes a component learning/extraction module, component classifier training module, knowledge base for component classification (KBCC), component extraction module (CEM), object identification training module (OITM), knowledge base for face identification (KBFI), and object identification module (OIM). The CEM receives image data of faces at various viewpoints and extracts outputs of classification of the component data, using the results of classifier training of the component data, stored in the KBCC. The OITM receives the outputs of classification of the component data and determines indicator component for each person by Bayesian estimation so that posterior probability of a predetermined attention class is maximized under the outputs of classification of the component data at various viewpoints. The KBFI stores indicator components for the individuals. The OIM receives the outputs of classification of the component data and identifies faces using the indicator components stored in the KBFI.

22 Claims, 21 Drawing Sheets

U.S. PATENT DOCUMENTS

| | | | |
|---|---|---|---|
| 6,108,437 A * | 8/2000 | Lin | 382/118 |
| 6,233,365 B1 | 5/2001 | Teruhiko | |
| 6,236,749 B1 * | 5/2001 | Satonaka et al. | 382/154 |
| 6,317,517 B1 | 11/2001 | Lu | |
| 6,324,532 B1 | 11/2001 | Spence et al. | |
| 6,421,463 B1 | 7/2002 | Poggio et al. | |
| 6,671,391 B1 * | 12/2003 | Zhang et al. | 382/118 |
| 6,888,955 B2 | 5/2005 | Masumoto et al. | |
| 6,975,750 B2 * | 12/2005 | Yan et al. | 382/118 |
| 6,999,605 B2 | 2/2006 | Kitagawa et al. | |
| 7,024,033 B2 * | 4/2006 | Li et al. | 382/159 |
| 7,099,510 B2 | 8/2006 | Jones et al. | |
| 7,218,759 B1 | 5/2007 | Ho et al. | |
| 7,280,697 B2 * | 10/2007 | Perona et al. | 382/225 |
| 2003/0044067 A1 | 3/2003 | Huang et al. | |
| 2003/0110038 A1 | 6/2003 | Sharma et al. | |
| 2003/0215115 A1 * | 11/2003 | Kim et al. | 382/118 |
| 2003/0225526 A1 | 12/2003 | Golub et al. | |
| 2004/0064464 A1 | 4/2004 | Forman et al. | |
| 2005/0036676 A1 | 2/2005 | Heisele | |

FOREIGN PATENT DOCUMENTS

| | | |
|---|---|---|
| JP | 2001-307090 | 11/2001 |
| JP | 2001-307096 | 11/2001 |
| JP | 2003-150963 A | 5/2003 |
| WO | WO 02/39371 A2 | 5/2002 |

OTHER PUBLICATIONS

Paul Viola, "Comlex Feature Recognition: A Bayesian Approach for Learning to Recognize Objects", AI Memo No. 1591, Artificial Intelligence Laboratory, MIT, Cambridge MA, Nov. 1996.*

Paul Viola, Michael J. Jones, "Robust Real-time Object Detection", Cambridge Research Laboratory, Cambridge, Massachusetts, Feb. 2001, pp. 1-25.*

Bernd Heisele et al., "Feature Reduction and Hierarchy of Classifiers for Fast Object Detection in Video Images", Computer Vision and Pattern Recognition, IEEE Computer Society Conference vol. 2, 2001, pp. 18-24.*

Alex Pentland, Baback Moghaddam and Thad Starner, "View-Based and Modular Eigenspaces for Face Recognition" Computer Vision and Pattern Recognition, 1994. Proceedings CVPR '94., 1994 IEEE Computer Society Conference, Jun. 21-23, 1994, pp. 84-91.*

Ralph Gross, Jie Yang and Alex Weibel, "Growing Gaussian Mixture Models for Pose Invariant Face Recognition" Pattern Recognition, 2000. Proceedings. 15th International Conference on vol. 1, Sep. 3-7, 2000 pp. 1088-1091.*

Andersen, R.A. et al., "Multimodal Representation of Space in the Posterior Parietal Cortex and Its Use in Planning Movements," Annual Review of Neuroscience, vol. 20, 1997, pp. 303-330.

Beymer, D. J., "Face Recognition Under Varying Pose," A.I. Memo 1481, Center for Biological and Computational Learning, M.I.T., Cambridge, MA, 1993.

Blanz, V. et al., "A Morphable Model for the Synthesis of 3D Faces, Computer Graphics Proceedings SIGGRAPH," pp. 187-194, Los Angeles, 1999.

Brunelli, R. et al., "Face Recognition: Features Versus Templates, IEEE Transactions on Pattern Analysis and Machine intelligence," 15(10), pp. 1042-1052, 1993.

Dempster, A.P. et al., "Maximum Likelihood from Incomplete Data Via the EM Algorithm," Journal of the Royal Statistical Society, Series B, vol. 39, 1977, pp. 1-38.

Haxby, J.V. et al., "The Distributed Human Neural System for Face Perception," Trends in Cognitive Sciences, vol. 4, No. 6, Jun. 2000, pp. 223-233.

Heisele, B. et al., "Categorization by Learning and Combining Object Parts, Neural Information Processing Systems (NIPS)," pp. 1239-1245, Vancouver, 2001.

Heisele, B. et al., "Component-based Object Recognition, Designing Tomorrow's Category-Level 3D Object Recognition Systems: An International Workshop." Taormina, Sicily, 2003.

Heisele, B. et al., "Component-based Face Detection", Proceedings Of The IEEE Computer Society Conference On Computer Vision And Pattern Recognition (CVPR) 2001, Kauai, HI, vol. 1, Sep. 10, 2001, pp. 657-662.

Heisele, B. et al., "Face Detection in Still Gray Images," A.I. Memo 1687, Center for Biological and Computational Learning, M.I.T., Cambridge, MA, May 2000.

Heisele, B. et al., "Face Recognition With Support Vector Machines: Global Versus Component-Based Approach," Proc. $8^{th}$ International Conference on Computer Vision, vol. 2, pp. 688-694, Vancouver, 2001.

Heisele, B. et al., "Learning and Vision Machines," Proceedings of the IEEE, vol. 90, No. 7, Jul. 2002, pp. 1164-1177.

Huang, J. et al., "Component-Based Face Recognition with 3D Morphable Models," Proceedings of the $4^{th}$ International Conference on Audio- and Video-Based Biometric Person Authentication (AVBPA), Jun. 9-11, 2003 (Lecture Notes in Computer Science, vol. 2688). Springer-Verlag Berlin, Germany, pp. 27-34.

Kim, T-K et al., "Component-Based LDA Face Descriptor for Image Retrieval," Proceedings of the British Machine Vision Conference (BMVC). Sep. 2-5, 2002, vol. 2. pp. 507-516.

Kobayashi, S. et al., "Influence of Reward Expectation on Visuospatial Processing in Macaque Lateral Prefrontal Cortex," J. Neurophysiol., vol. 87, 2002, pp. 1488-1498.

Koshizen, T. et al., "An Application of Hamiltonian Neurodynamics Using Pontryagin's Maximum (Minimum) Principle," International Journal of Neural Systems, vol. 6, No. 4, Dec. 1995, pp. 425-433.

Koshizen, T. et al., "A Computational Model of Attentive Visual System Induced by Cortical Neural Network," Neurocomputing, vol. 44, 2002, pp. 879-885.

Koshizen, T. et al., "Expectation Maximization of Prefrontal-Superior Temporal Network by Indicator Component-Based Approach," Proceedings for CNS 2003, The Annual Computational Neuroscience Meeting, Jul. 5-9, 2003 (Neurocomputing 58-60, 2004, pp. 619-624).

Logothetis, N.K. et al., "Shape Representation in the Inferior Temporal Cortex of Monkeys" Current Biology, vol. 5, No. 5, 1995, pp. 552-563.

Mesulam, M.-M., "Spatial Attention and Neglect: Parietal, Frontal and Cingulate Contributions to the Mental Representation and Attentionat Targeting of Salient Extrapersonal Events," Phil. Trans. R. Soc. Lond. B. vol. 354, 1999, pp. 1325-1346.

Miller, E.K. et al., "An Integrative Theory of Prefrontal Cortex Function," Annu. Rev. Neurosci., 2001, pp. 167-202, vol. 24.

Neal, R.M. et al., "A View of the EM Algorithm that Justifies Incremental, Sparse, and Other Variants," in Learning in Graphical Models, 1998.

PCT International Search Report and Written Opinion, PCT/IB2004/003274, Apr. 6, 2005.

PCT International Search Report and Written Opinion, PCT/US2004/021158, Mar. 31, 2005.

Vapnik, V. N., *Statistical Learning Theory*, 1998, pp. 401-408.

Viola, Paul, "Complex Feature Recognition: A Bayesian Approach for Learning to Recognize Objects," AI Memo No. 1591, Artificial Intelligence Laboratory, MIT, Cambridge, MA, Nov. 1996.

Wahba, G., "Support Vector Machines, Reproducing Kernel Hilbert Spaces, and Randomized GACV," Chapter 6 of *Advances in Kernel Methods—Support Vector Learning*, Eds. B. Scholkopf et al., The MIT Press, 1999, pp. 69-88.

Wallraven, C. et al., "View-Based Recognition of Faces in Man and Machine: Re-visiting Inter-Extra-Ortho, Lecture Notes in Computer Science," 2525, pp. 651-660, 2002.

Wiskott, L. et al., "Face Recognition by Elastic Bunch Graph Matching, Chapter 11 of Intelligent Biometric Techniques in Fingerprint and Face Recognition," Eds. L.C. Jain et al., CRC Press, pp. 355-396, 1999.

Lin, C. et al., "Automatic Facial Feature Extraction by Applying Genetic Algorithms," Proceedings of International Conference on Neural Networks, Jun. 9-12, 1997, Houston, TX, pp. 1363-1367, vol. 3.

Stewart, R.D. et al., "Region Growing with Pulse-Coupled Neural Networks: An Alternative to Seeded Region Growing," IEEE Transactions on Neural Networks, Nov. 2002, pp. 1557-1562, vol. 13, No. 6.

Clippingdale, S. et al., "Performance Improvement and Database Registration in the FAVRET Face Detection, Tracking and Recognition System," Technical Report of the Institute of Electronics, Information and Communication Engineers, Mar. 8, 2001, vol. 10, No. 701, pp. 111-118, Japan (with English abstract).

European Patent Office Communication, European Patent Application No. EP 04777379.1, Aug. 5, 2009, 3 pages.

Japanese Office Action, Japanese Patent Application No. 2006-517819, Feb. 17, 2010, 10 pages.

Japanese Office Action, Japanese Patent Application No. 2006-516619, Feb. 16, 2010, 9 pages.

European Patent Office Communication, European Patent Application No. EP 04 777 379.1, Apr. 30, 2010, 5 pages.

Japanese Patent Office Final Notice, Japanese Patent Application No. JP 2006-516619, May 18, 2010, 3 pages.

Japanese Patent Office Final Office Action, Japanese Patent Application No. JP 2006-517819, May 14, 2010, 3 pages.

\* cited by examiner

SYSTEM AND METHOD FOR FACE RECOGNITION

RELATED APPLICATIONS

This application claims priority to PCT Application Serial No. PCT/IB2004/003274, filed on Jun. 30, 2004, entitled "System And Method for Face Recognition", which claims priority and incorporates by reference U.S. Provisional application No. 60/484,201 filed on Jun. 30, 2003 by Takamasa Koshizen et al. This application is also related to U.S. utility application Ser. No. 10/882,981, filed on Jun. 30, 2004, by Bernd Heisele, which is incorporated by reference herein in its entirety.

TECHNICAL FIELD

The invention relates to a face recognition system and a face recognition method. The invention relates particularly to a system and a method for face recognition with higher accuracy while requiring a smaller amount of data for the face recognition.

BACKGROUND ART

In many fields including security technology, there is a need for a system and a method for recognizing faces of individuals with higher accuracy.

A face recognition method using templates and that utilizing features obtained based on values of brightness are conventionally well known. Heisele, B., Poggio, T. and Pontil, M., (2000), "Face detection in still gray images", A. I. Memo 1687, Center for Biological and Computational Learning, MIT, Cambridge, Mass., a method is proposed in which features of components such as eyes, a nose and a mouth are extracted from an input image under little influence of brightness, for face recognition with higher accuracy. In the method, a support vector machine (SVM) is used to classify the extracted features of components such as eyes, a nose and a mouth, for face recognition.

However, conventional systems or methods require a huge amount of data for face recognition with higher accuracy. For example, preparing templates for various viewpoints increases data without flexibility. Further, learning features of components such as eyes, a nose and a mouth, at different viewpoints and under different conditions of illumination, requires an exponentially increasing amount of information and a volume of databases containing the information, although such a learning will increase accuracy of face recognition.

SUMMARY OF THE INVENTION

A face recognition system according to an aspect of the claimed invention, is provided with a component learning/extraction module, a component classifier training module, a knowledge base for component classification, a component extraction module, an object identification training module, a knowledge base for face identification and an object identification module.

The component learning/extraction module receives image data of faces of individuals at various viewpoints and extracts component data at various viewpoints from the image data of faces of individuals at various viewpoints.

The component classifier training module receives the component data at various viewpoints and produces results of classifier training of the component data at various viewpoints.

The knowledge base for component classification stores the results of classifier training of the component data at various viewpoints.

The component extraction module receives image data of faces of individuals at various viewpoints and extracts outputs of classification of the component data at various viewpoints, using the results of classifier training of the component data at various viewpoints, stored in the knowledge base for component classification.

The object identification training module receives the outputs of classification of the component data at various viewpoints and determines an indicator component for each of the individuals by Bayesian estimation in such a way that posterior probability of a predetermined attention class is maximized under the outputs of classification of the component data at various viewpoints.

The knowledge base for face identification stores indicator components for the individuals.

The object identification module receives the outputs of classification of the component data at various viewpoints and identifies faces of the individuals using the indicator components for the individuals stored in the knowledge base for face identification.

A method for recognizing faces of individuals according to another aspect of the claimed invention, is performed by a face recognition system comprising a component learning/extraction module, a component classifier training module, a knowledge base for component classification, a component extraction module, an object identification training module, a knowledge base for face identification and an object identification module.

The method has the step of the component learning/extraction module receiving image data of faces of individuals at various viewpoints and extracting component data at various viewpoints from this image data.

The method has the step of the component classifier training module receiving the component data at various viewpoints, producing results of classifier training of the component data at various viewpoints and storing the results of classifier training of the component data at various viewpoints, in the knowledge base for component classification The method has the step of the component extraction module receiving image data of faces of individuals at various viewpoints and extracting outputs of classification of the component data at various viewpoints, using the results of classifier training of the component data at various viewpoints, stored in the knowledge base for component classification.

The method has the step of the object identification training module receiving the outputs of classification of the component data at various viewpoints, determining indicator component for each of the individuals by Bayesian estimation in such a way that posterior probability of a predetermined attention class is maximized under the outputs of classification of the component data at various viewpoints and storing indicator components for the individuals, in the knowledge base for face identification.

The method has the step of the object identification module receiving the outputs of classification of the component data at various viewpoints and identifying faces of the individuals using the indicator components for the individuals stored in the knowledge base for face identification.

A program for recognizing faces of individuals according to another aspect of the claimed invention, is run on a computer and has a component learning/extraction module, a component classifier training module, a knowledge base for component classification, a component extraction module, an object identification training module, a knowledge base for face identification and an object identification module.

The component learning/extraction module has the computer perform the step of receiving image data of faces of individuals at various viewpoints and extracting component data at various viewpoints from the image data of faces of individuals at various viewpoints.

The component classifier training module has the computer perform the step of receiving the component data at various viewpoints, producing results of classifier training of the component data at various viewpoints and storing the results of classifier training of the component data at various viewpoints, in the knowledge base for component classification.

The component extraction module has the computer perform the step of receiving image data of faces of individuals at various viewpoints and extracting outputs of classification of the component data at various viewpoints, using the results of classifier training of the component data at various viewpoints, stored in the knowledge base for component classification.

The object identification training module has the computer perform the step of receiving the outputs of classification of the component data at various viewpoints, determining indicator component for each of the individuals by Bayesian estimation in such a way that posterior probability of a predetermined attention class is maximized under the outputs of classification of the component data at various viewpoints and storing indicator components for the individuals in the knowledge base for face identification.

The object identification module has the computer perform the step of receiving the outputs of classification of the component data at various viewpoints and identifying faces of the individuals using the indicator components for the individuals stored in the knowledge base for face identification.

According to the claimed invention, indicator components for the individuals can be obtained through training using image data of faces at various viewpoints. So, a system and a method according to the claimed invention allow viewpoint-independent face recognition with higher accuracy. Further, since indicator components alone are stored in the knowledge base for identification, a volume of data required for face recognition can be minimized.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1A:
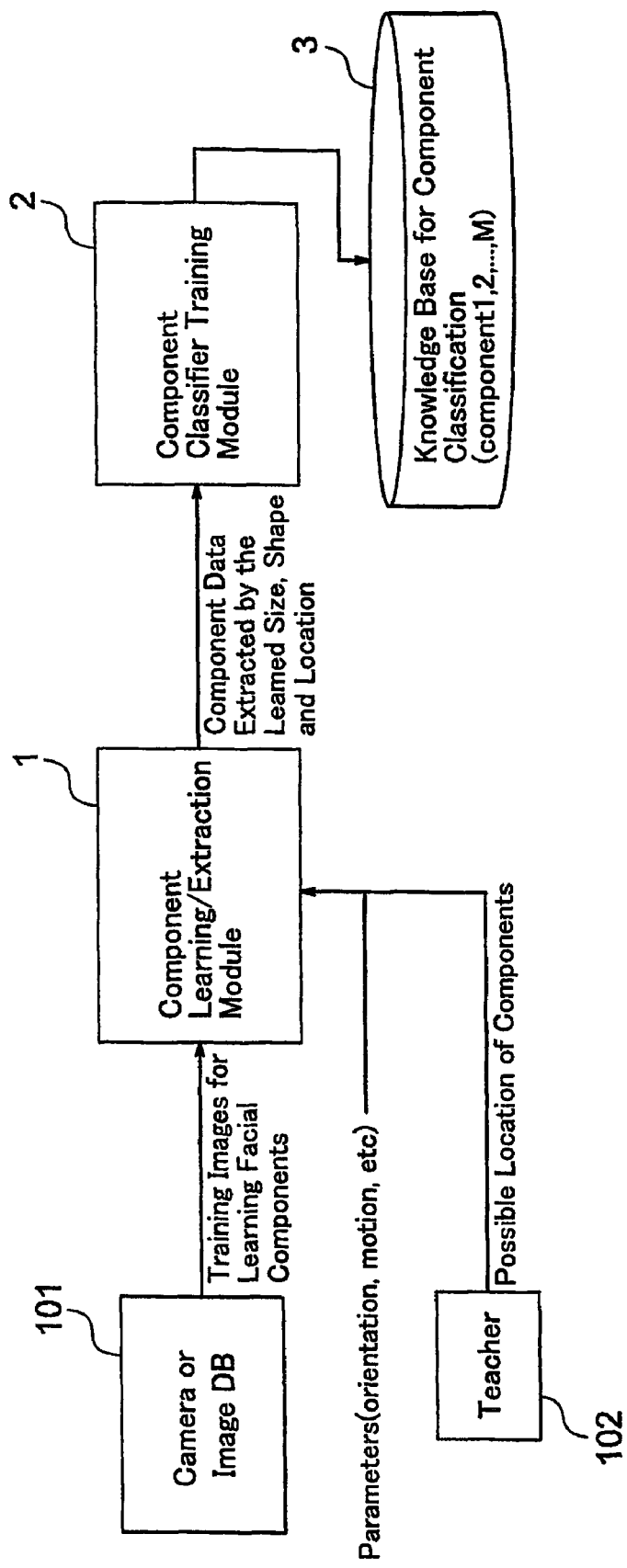
FIG. 1A shows portions of the face identification system according to an embodiment of the claimed invention, which perform component learning/extracting.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1A shows portions of the face identification system according to an embodiment of the claimed invention, which perform component learning/extracting phase. A component learning/extracting module 1 receives training images for learning facial components, from a camera or an image database 101. The component learning/extracting module 1 also receives parameters including those indicating orientations and motions (viewpoints) of faces and possible locations of components, from a teacher 102. The component learning/extracting module 1 extracts component data using the learned size, shape and location and delivers them to a component classifier training module 2. The component classifier training module 2 performs "1 vs. all classification" (one-verses-all classification) of the component data at various viewpoints, for each individual, using a support vector machine. "1 vs. all classification" requires less amount of training than "bottom-up 1 vs. 1 classification". Results of classifier training are represented by support vectors. The support vectors are expected to move closer to the hyperplane by training. The component classifier training module 2 stores the results of classifier training in a knowledge base for component classification 3.

In this specification, module means a hardware unit or a software unit which performs a predetermined function. The hardware unit includes various kinds of processors. The software unit includes various kinds of programs to be run on various kinds of processors.

Figure 1B:
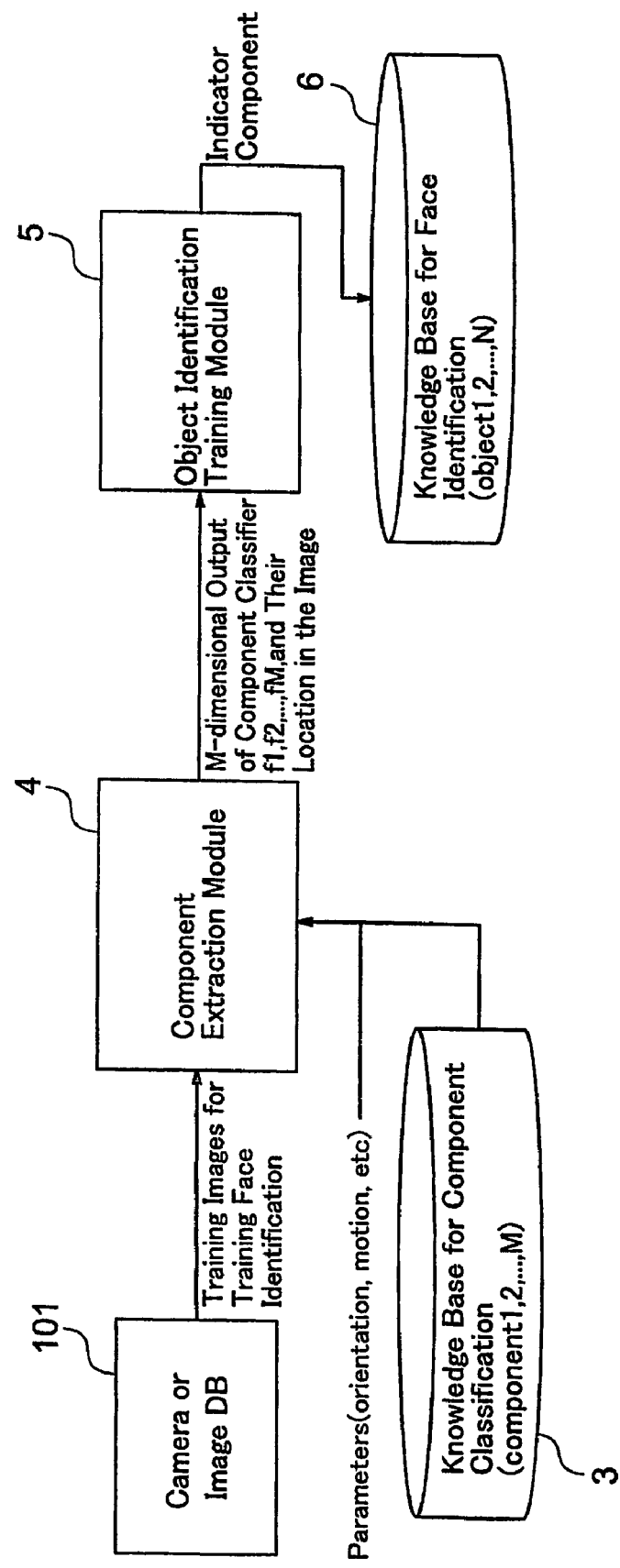
FIG. 1B shows portions of the face identification system according to an embodiment of the claimed invention, which perform identification learning.

FIG. 1B shows portions of the face identification system according to an embodiment of the claimed invention, which perform identification learning phase. A component extraction module 4 receives training images for training face identification, from a camera or an image database 101. The component extraction module 4 also receives the results of classifier training with parameters including those indicating orientations and motions (viewpoints) of faces, from the knowledge base for component classification 3. The component extraction module 4 produces M-dimensional outputs of component classification at various viewpoints, and delivers the outputs to an object identification training module 5, where M represents the number of the components. The outputs of component classification are represented by support vectors. The object identification training module 5 receives the outputs at various viewpoints and determines indicator component for each of the individuals by Bayesian estimation or other statistical technique in such a way that posterior probability of a predetermined attention class is maximized under the outputs at various viewpoints. Then the object identification training module 5 stores the indicator components for the individuals in a knowledge base for face identification 6. Since the knowledge base for face identification 6 stores the indicator components for the individuals, alone, a volume of the database can be significantly reduced. Operations of the object identification training module 5, will be described in more detail later.

Figure 1C:
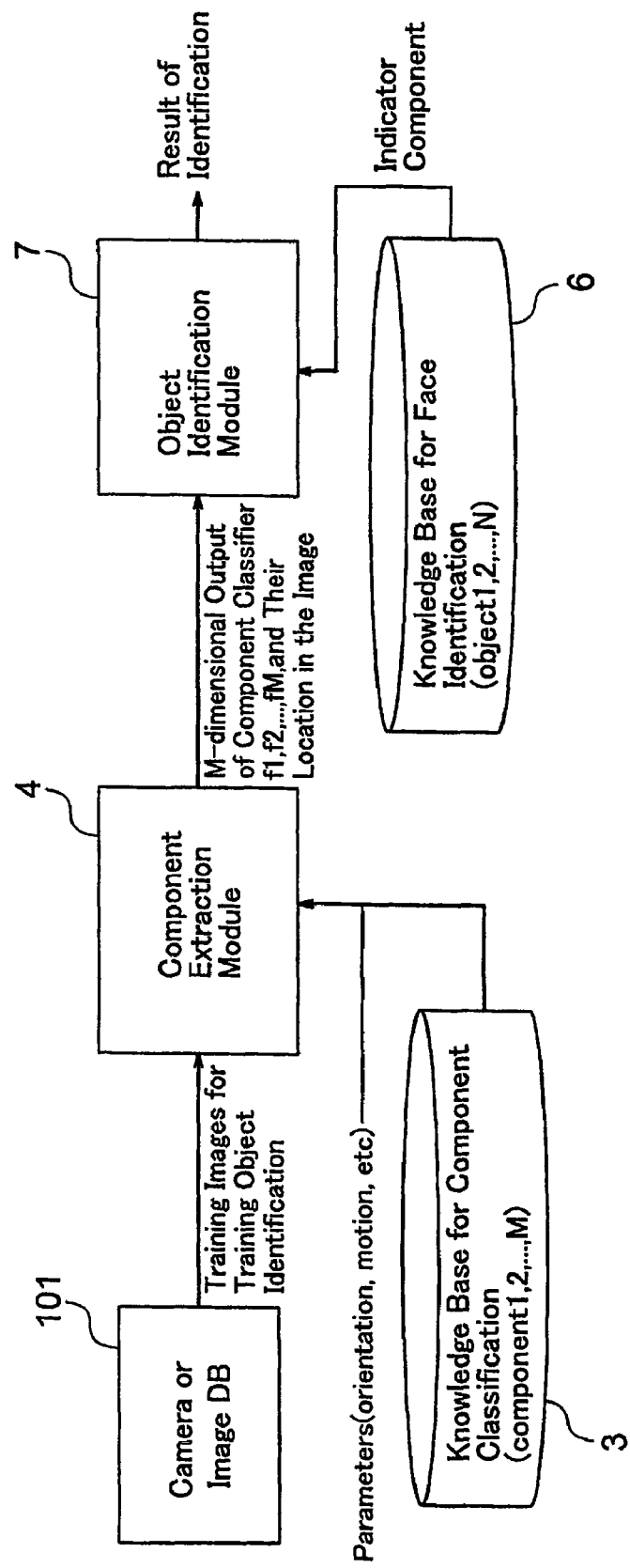
FIG. 1C shows portions of the face identification system according to an embodiment of the claimed invention, which perform identification.

FIG. 1C shows portions of the face identification system according to an embodiment of the invention, which perform identification phase. The component extraction module 4 receives images for object identification, from a camera or an image database 101. The component extraction module 4 also receives the results of classifier training with parameters including those indicating orientations and motions (viewpoints) of faces, from the knowledge base for component classification 3. The component extraction module 4 produces M-dimensional outputs of component classification, and delivers the outputs to an object identification module 7, where M represents the number of the components. The object identification module 7 receives the outputs and retrieves indicator components for the individuals stored in the knowledge base for face identification 6. Then the object identification module 7 identifies individuals using the outputs and the indicator components for the individuals.

Figure 19:
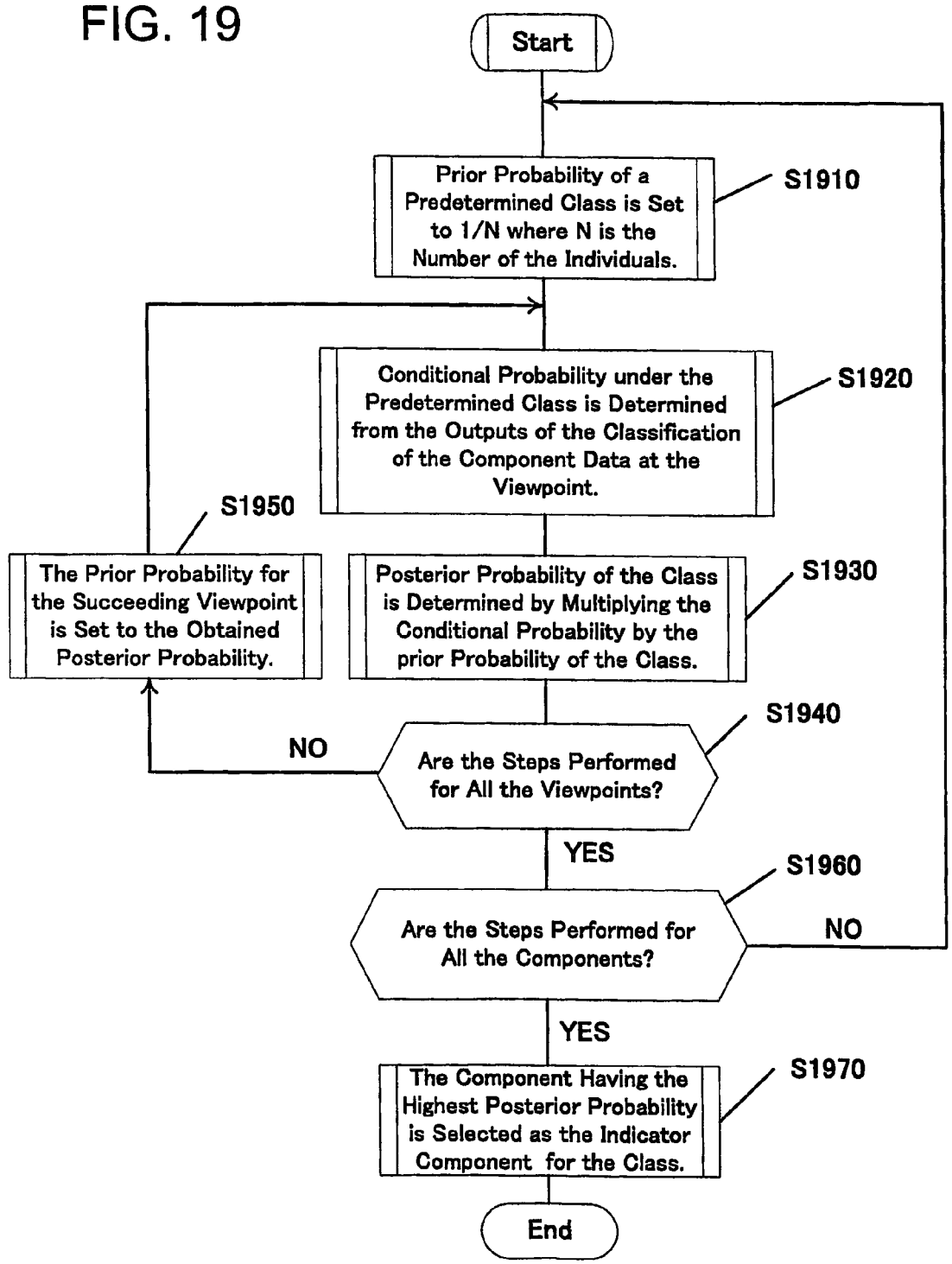
FIG. 19 shows operations of the object identification training module.

FIG. 19 shows operations of the object identification training module 5. In step S1910, prior probability of each class is set to 1/N, where N is the number of the individuals. In step S1920, conditional probability of the outputs of classification of the component data at a certain viewpoint, under each class, is determined from the outputs of classification of the component data at the viewpoint. In step S1930, posterior probability of each class is determined by multiplying the conditional probability by the prior probability of each class. In step S1940, it is determined whether the above-mentioned steps are performed for all the viewpoints. If the answer is negative, in step S1950 the prior probability for the succeeding viewpoint is set to the obtained posterior probability and then the process returns to step S1920. If the answer is affirmative, the process proceeds to step S1960. In step S1960, it is determined whether the above-mentioned steps are performed for all the components. If the answer is negative, the process returns to step S1910. If the answer is affirmative, the process proceeds to step S1970. In step S1970, the component having the highest posterior probability of each class is selected as the indicator component for the class.

Figure 18:
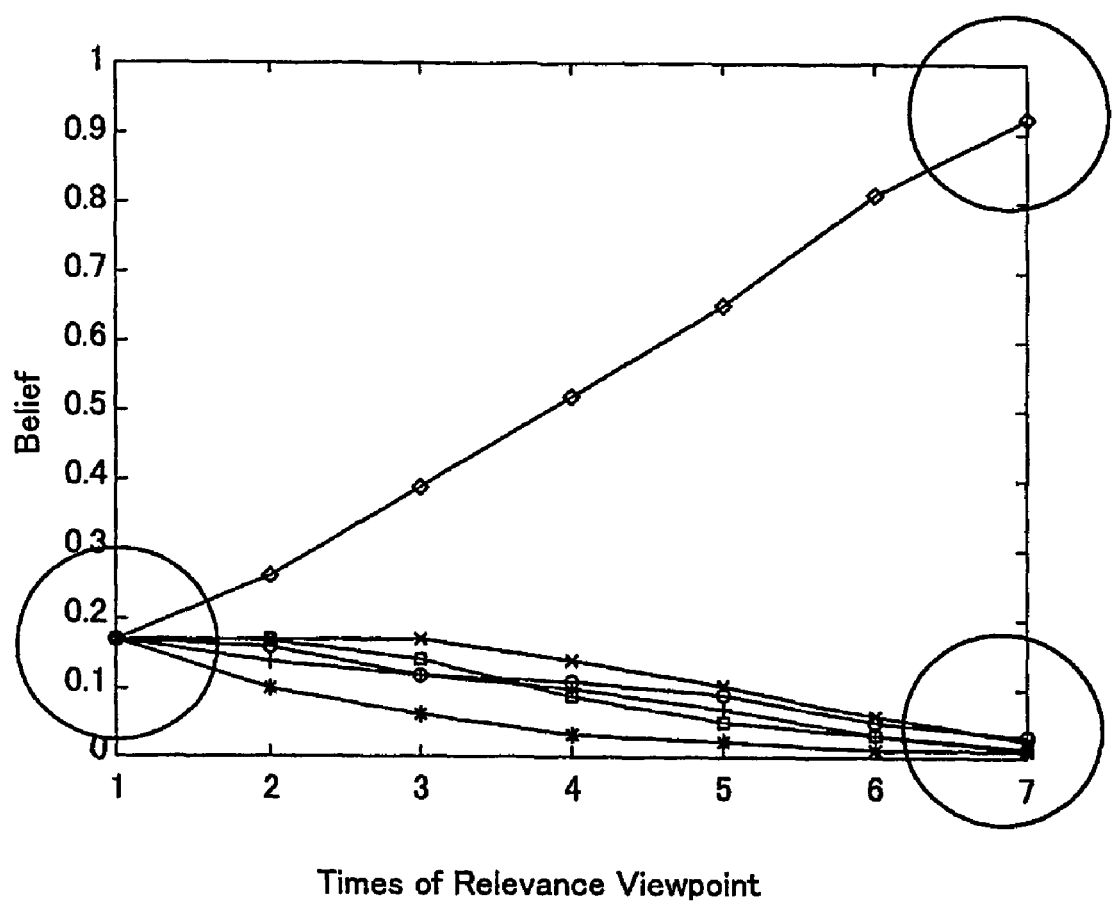
FIG. 18 shows an example of the results of operations of the object identification training module.

FIG. 18 shows an example of the results of operations of the object identification training module 5. The horizontal axis represents viewpoints, while the vertical line represents posterior probability or belief. The number of viewpoints is 6. At first, posterior probability is ⅙ for each of the classes. As operations are performed for increasing number of viewpoints, probability of a certain class increases and those of the other classes approach zero. After operations have been performed for the 6 viewpoints, the probability of the certain class is more than 0.9, while the probabilities of the other classes are nearly zero.

System Architecture: Indicator Facial Component-Based Learns Approach

Figure 2:
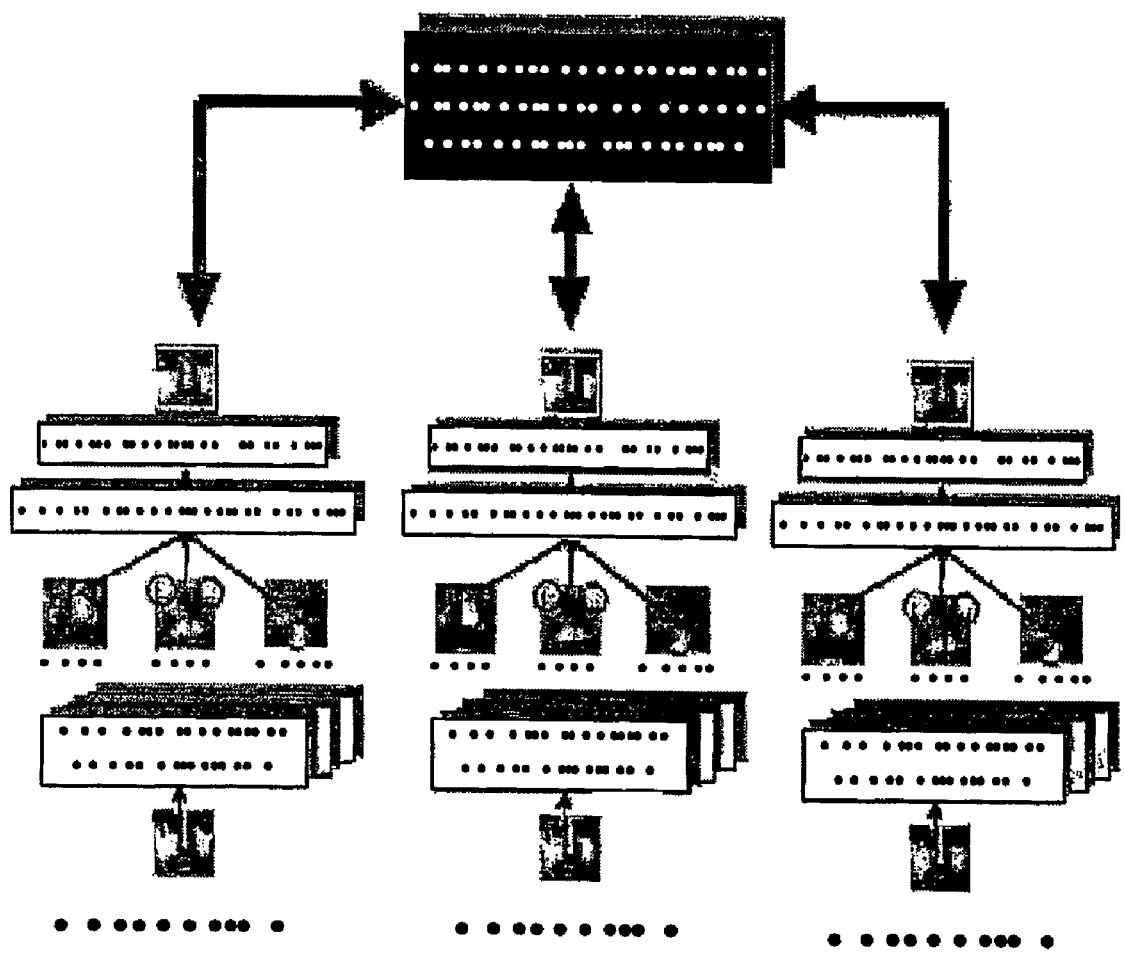
FIG. 2 shows an overview of indicator SVM component multiple classifier system.

In this section, we describe the computational aspect of indicator facial component-based approach. The overview of proposed system is shown in FIG. 2 where multiple classifier system learning to extract the indicator facial component that can abstract the informative source to distinguish different faces. The proposed system originates the single Support Vector Machine (SVM) component-based classifier initially proposed by Heisele, B., Poggio. T. and Pontil, M., (2000), "Face detection in Still Gray Images", A. 1. memo 1687, Center for Biological and Computational Learning, MIT, Cambridge, Mass., which is incorporated by reference herein in its entirety. The basic computation of the single SVM component-based classifier is aimed to detect faces of different sizes and arbitrary positions in a gray value input image. In order to do so it recalls the input image and then sifts a window of fixed size over each of the scaled images. The pattern within each window is analyzed by our two-level component-based classifier, which has a binary output indicating that there is a face in the window or not. In short, the first level of component classifier plays independently the role of detecting each component of the face. The SVM component classifier is also employed to learn each facial components such as eye, nose and mouth.

1) Basis of Support Vector Machine

The most basic SVM distinguishes between two classes of data by finding an optimal hyperplane (also known as the decision plane) that separates the classes with respect to structural risk minimization. A new data point is classified by determining which side of the decision plane it lies on. The SVM determines the hyperplane that maximizes the distance between the two classes and chooses it to be the decision plane. Notably, this plane is determined entirely by the support vectors (SVs), which are the closest training data points of each class to the decision plane'. Additionally, the distance from the decision plane to the SVs is called the 'margin'.

When the data are not linearly separable, we map $x_i$ and x in the input space to $\phi(x_i)$ and $\phi(x)$ of a higher dimensional feature space extracted from the grey value input image. In some cases, the grey value input image can be transformed by histogram equalization method to obtain better resolution of the input images. In our case, positive training are generated by taking into account different illuminations and rotations with synthetic faces.

Figure 3:
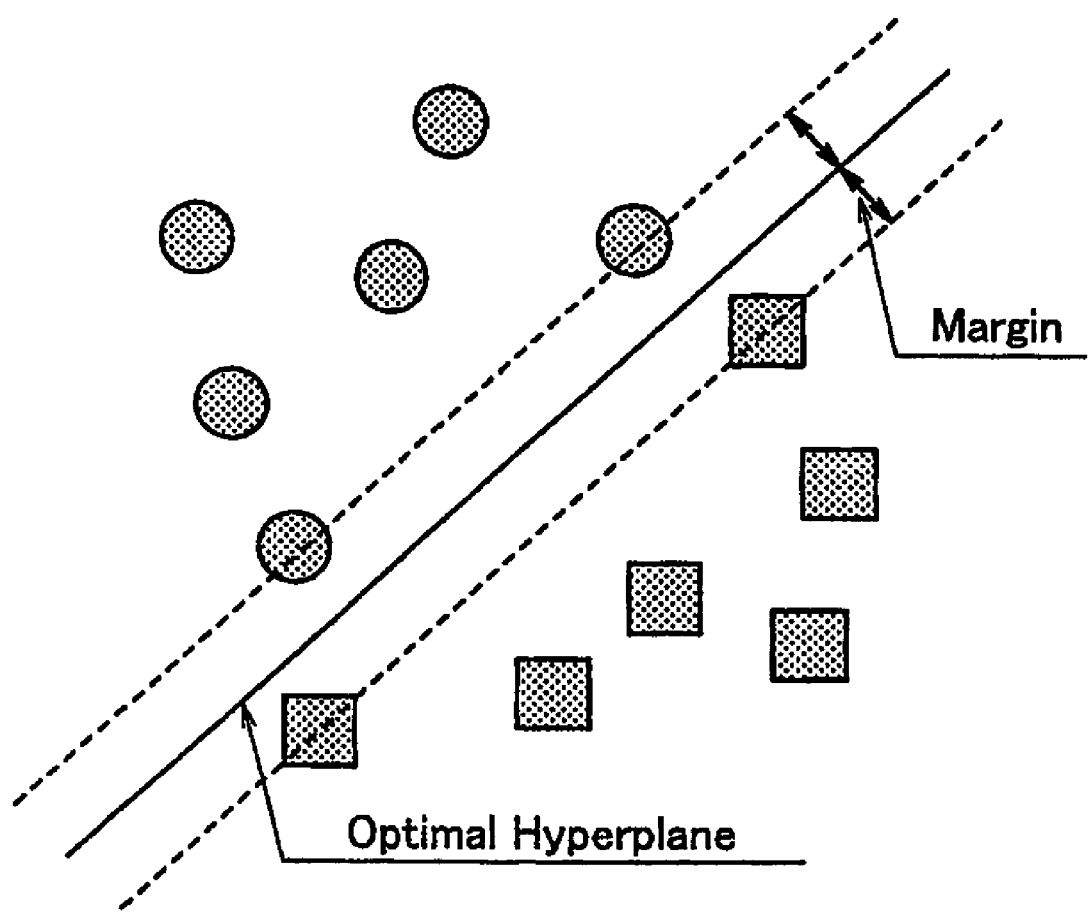
FIG. 3 shows classification between two classes using hyperplane (optimal separating hyperplane with the largest margin identified by the dashed line, passing the support vectors).

FIG. 3 shows the description in the case of two classification problem.

Each feature vectors are nonlinearly separated by the SVM classifier. The mapping $\phi(x_i)$ and $\phi(x)$ are represented by a kernal function $K(x_i, x)$ given by e.g. Gaussians.

The general SVM decision function has the following form:

$$f(x) = \Sigma_{i=1}^{l} w_i \cdot K(x_i, x) + b \quad (1)$$

$$f(x) = \Sigma_{i=1}^{l} y_i \alpha_i K(x_i, x) + b \quad (2)$$

where $x_i \in R^n, i=1, 2, \ldots, l$ are the training data. Each point of $x_i$ belongs to one of the two classes identified by the label $y_i \in \{-1, 1\}$. The coefficients $\alpha_i$ and b are resulted as the solutions of a quadratic programming problem. $\alpha_i$ are non-zero for support vectors and are zero otherwise.

For determining that hyperplane the following functional is taken into account of $\alpha$:

$$\Gamma^2(\alpha) = 2\Sigma_{i=1}^{l} \alpha_i - \Sigma_{i,j=1}^{l} \alpha_i \alpha_j y_i y_j K(x_i, x_j) \quad (3)$$

under constraints $\Sigma_{i=1}^{l} = 0$ and $C \geq \alpha_i \geq 0, i=, \ldots, l$.

Let M be twice the distance of the support vectors to the hyperplane.

M denotes margin, and which is given:

$$M = \frac{1}{\sqrt{\sum_{i=1}^{l} \alpha_i}} \quad (4)$$

The margin is an indicator of the separability of underlying data points.

In fact, the expected error probability of the SVM, $EP_{err}$, satisfies the bound as follows, $$EP_{err} \leq \frac{1}{l} E\left[\frac{D^2}{M^2}\right] \quad (5)$$

2) Face Component-Based Learning

Figure 4:
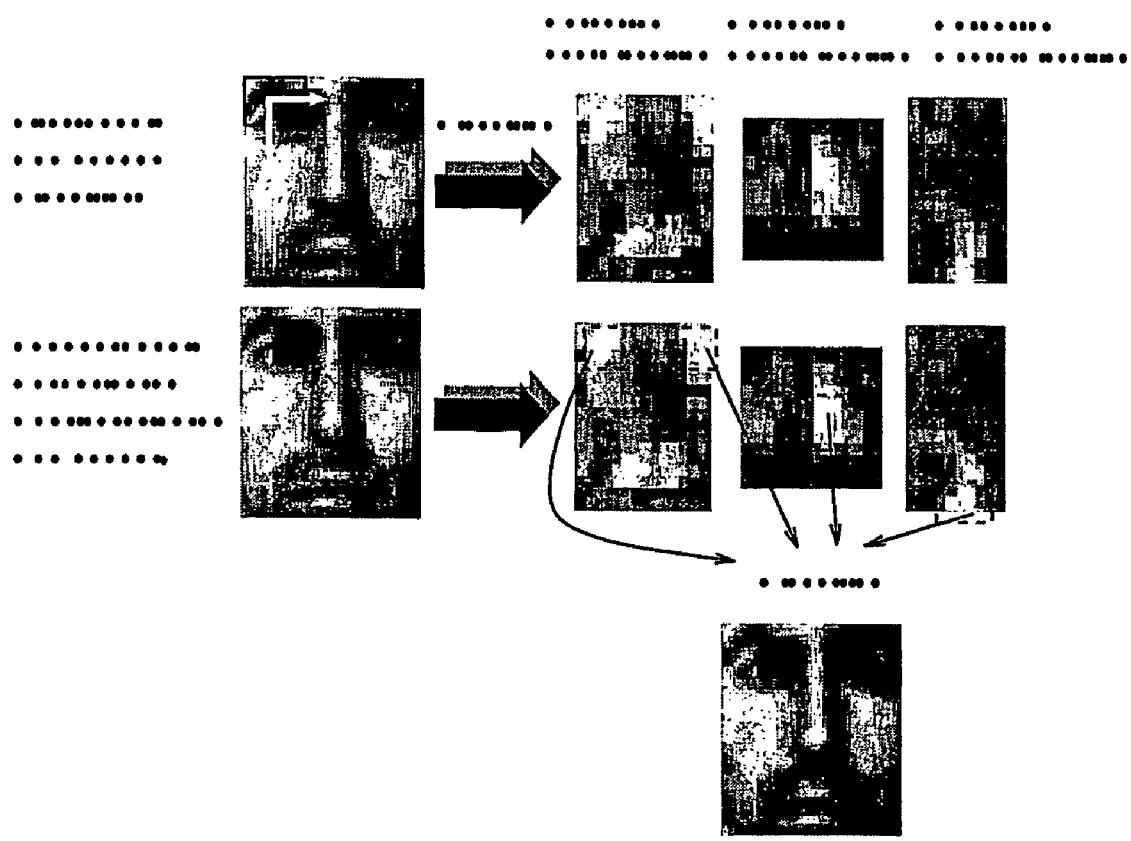
FIG. 4 shows a schematic drawing of two-level component face classifier.

Face component-based learning approach aims to detect faces of different sizes and arbitrary positions in a gray value input image (see Heisele referenced above). In order to do so, it rescales the input image and then sifts a window of fixed size over each of the scaled images. The pattern within each window is analyzed by our two-level component-based classifier, which has a binary output indicating that there is a face in the window or not. In more precisely, an overview of schematic drawing of the two-level component-based classifier is shown in FIG. 4. On the first level, component classifiers independently detect components of the face. This classifier allows the components to extract the features around eyes, nose and mouth. It employs linear SVM where their components are, for example trained on a set of extracted facial components and on a set of randomly selected non-face patterns. The components are automatically extracted from synthetic face images generated from 3-D head models. On the second level the geometrical configuration classifier performs the final face detection by linearly combining the results of the component classifiers.

Given an input window, the maximum continuous outputs of the component classifiers within rectangular search regions around the expected positions of the components are used as inputs to the geometrical configuration classifier. The search regions have been calculated from the mean and standard deviation of the locations of the components in the training images. Additionally, it provides the geometrical classifier with the precise positions of the detected components relative to the upper left corner of the input window. We have eventually three values per component classifier that are propagated to the geometrical classifier. The output of the geometrical classifier indicates if there is a face inside the window or not.

Figure 5:
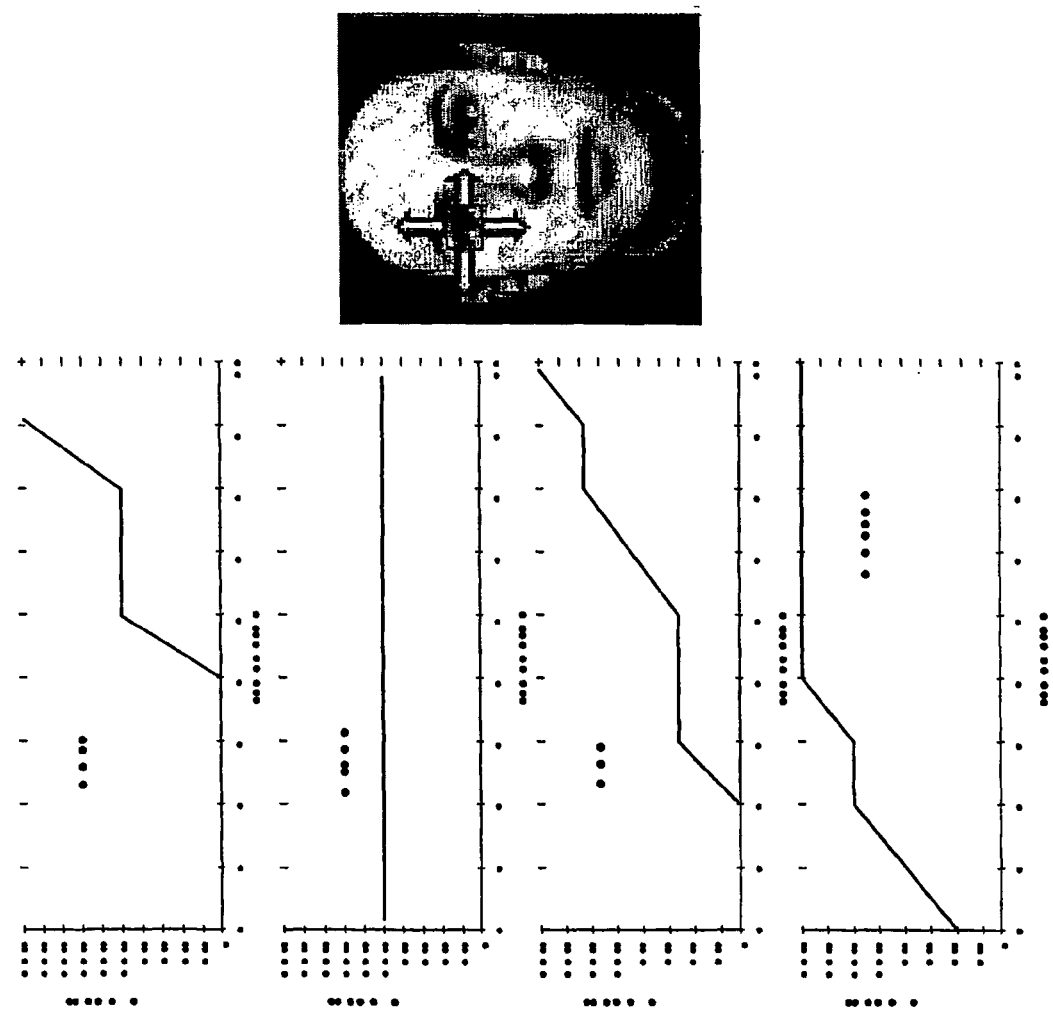
FIG. 5 shows an example of growing the component by up, down, right and left.

Accordingly, FIG. 5 shows a fluctuated rectangle, which is a result of the facial component-based approach and those outcomes the variance of margins (graph) over the right eye component in left, right, top and Bottom cases.

3) PFC-Based Bidirectional Neuronal Network Model

Koshizen et al. has previously proposed PFC (prefrontal cortex)-base bidirectional attention network model where attention classes $\Omega_i$ are yielded according that attention demanding takes place by its monitoring process. Attention modulation process is then undertaken by the attention demanding process. In human brain, it is assumed that the attention demanding may be related to Anterior Cingulate Cortex (ACC) whereas the attention modulation may be related to Posterior Parietal Cortex (PPC). It is known that PPC plays a subsidiary role in sequential learning when it is incorporated with PFC. PPC neurons are also involved in sensorimotor integration and transformation, see, e.g., Andersen, R. A., Snyder, L. H., Bradley, D. C. and Xmg. J (1997) Multimodal representation of space in the posterior parietal cortex and its use in planning movements," Annual Review of Neuroscience, Vol. 20, pp. 303-330, which is incorporated by reference herein in its entirety. In short, PFC tightly interconnects with ACC and PPC to attain the computation of spatial attention and neglect to mental representation and cognitive contents as is shown in Mesulam M-M (1999), "Spatial attention and neglect: parietal, frontal and cingulate contributions to the mental representation and attentional targeting of salient extrapersonal events", Phil Trans R Soc Lond B Vol. 354, pp. 1325-1346, which is incorporated by reference herein in its entirety. In the network, Bayesian learning has the meaningful role to train the temporal correlation over the prior probabilities of facial viewpoints taken at different time scales, and which is derivative by the following bayes' theorem:

$$P^{post}(\Omega_w | I) = \frac{P^{pri}(\Omega_w)P(I | \Omega_w)}{\sum_m P^{pri}(\Omega_w)P(I | \Omega_w)} \quad (6)$$

where, I denotes the component feature resulted from SVM outputs, and $\Omega_w$ thus denotes w-th probabilistic attention class of indicator component. $P^{pri}$ is the prior probability of attention classes $\Omega^1$. Initially, $$P^{pri}(\Omega_w) = \frac{1}{N_w}$$

since we assume equal prior probabilities for each class. In practice, we approximate P $(I|\Omega_w)$ parameterized by $\hat{\theta}_f$. If class confidence were computed by integrating over $\theta$, probability would accumulate over the region with similar appearance and bias the result in favor of that face. Our method eliminates such bias and, since our ultimate goal is determining the correct class rather than correctly estimating the posterior class probabilities, our scheme is justified.

Accordingly, $$\Sigma_w P^{post}(\Omega_w | I) \equiv 1.0 \quad (7)$$

Figure 6:
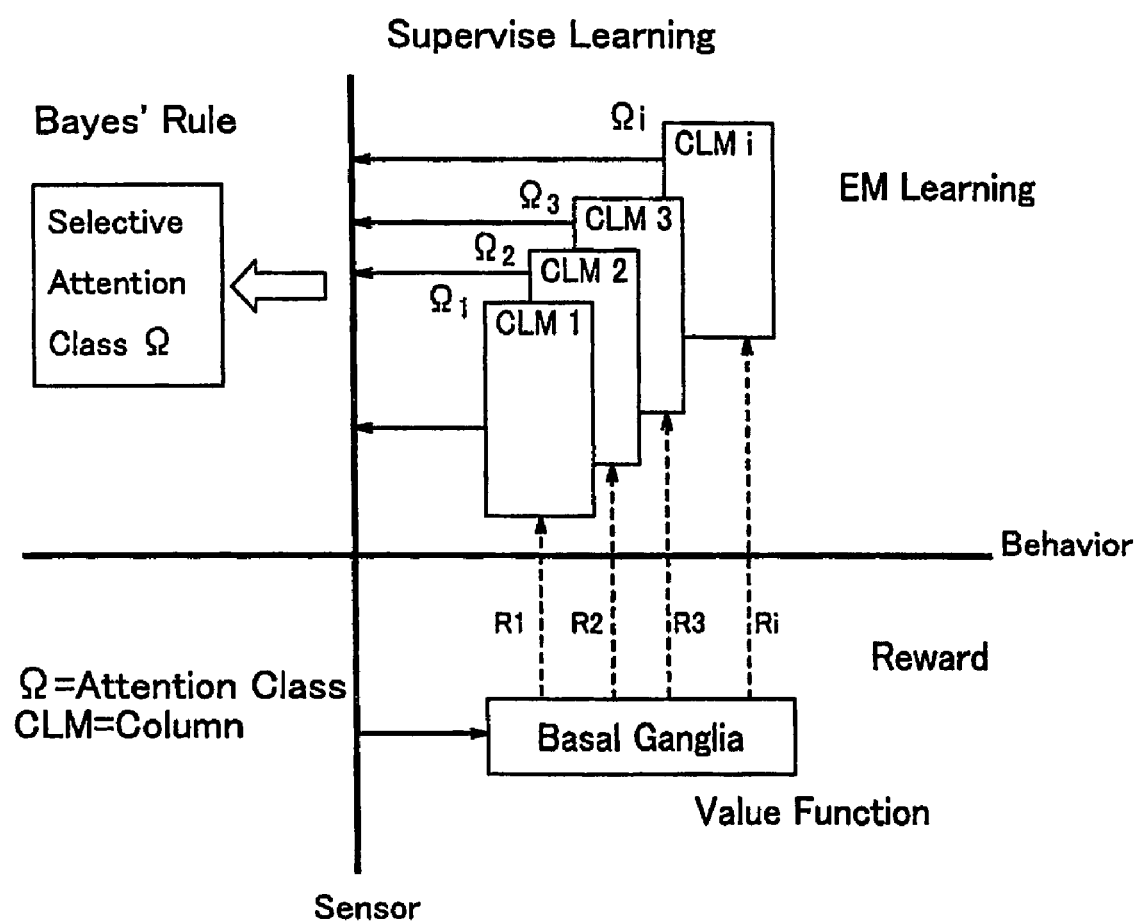
FIG. 6 shows a PFC-based bidirectional attention network model.
Figure 7:
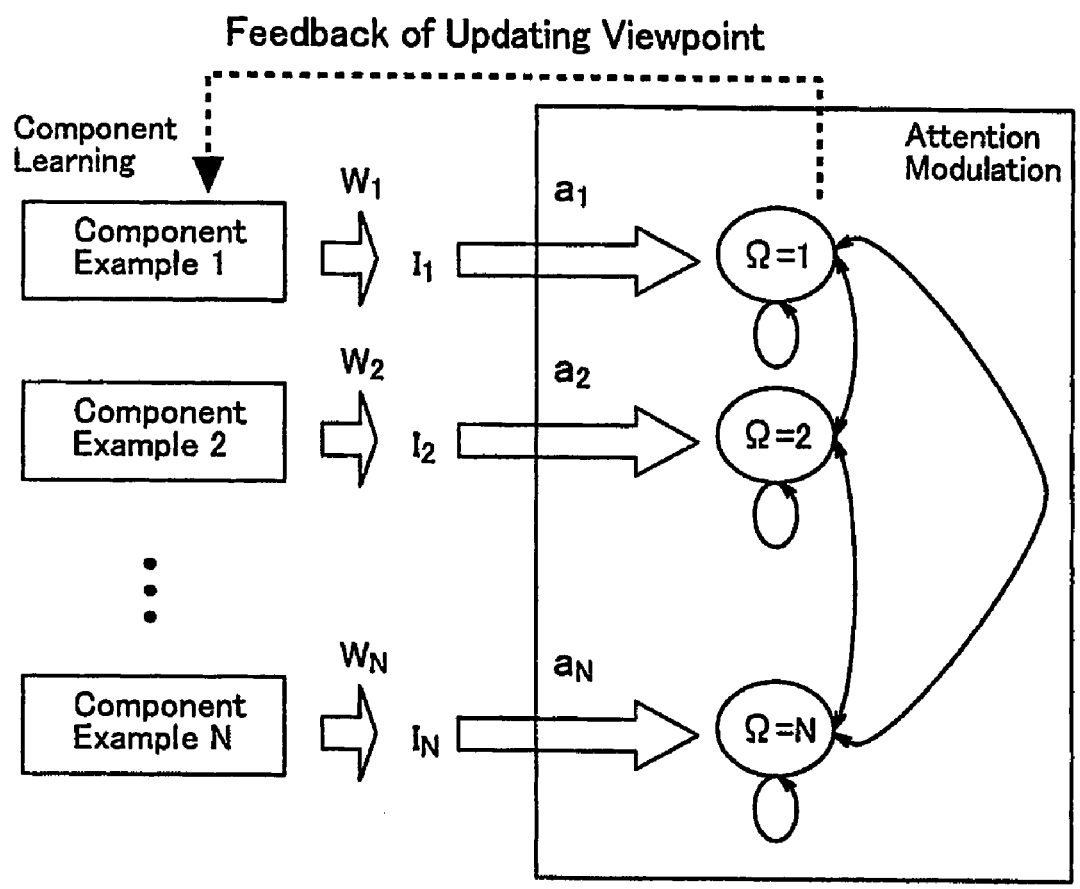
FIG. 7 shows a schematic view of proposed learning scheme (feedback process of updating different viewpoint is taken into account of maximizing the expectation value where the presence of distinguishing component characteristics are clearly visible are obviously preferred to extract the indicator component).

FIG. 6 shows PFC-based bidirectional attention network model that is composed of the top-down and bottom-up processing as described in Koshizen, T., Ueda, Y. and Tsujino, H. (2002), "The brain-like, sensory motor control system", Journal of Intelligent Robotic Systems, Kluwer Academic Publisher, Vol. 35, No. 3, pp. 265-288, which is incorporated by reference herein in its entirety. The attention network has basically a bidirectional loop composed of 'bottom-up' and 'top-down' processing; the bottom-up process involves in the analysis (grouping) of incoming sensory inputs, while the top-down process originates with stored models and information associated with each attention class (expectation). In our framework, the attention class can be stochastically modeled by a probability distribution. EM algorithm (one of statistical learning schemes) is thus compatible with the PFC-based bidirectional attention network model to calculate the internal state (column) as the attation class in FIG. 6. Another aspect allows the attention network to employ Bayesian learning as inductive temporal reasoning. The Bayesian computation implies the products of a likelihood based on the evidence at hand and the prior founded on a prior knowledge. In practice, the product is called the posterior:

Posterior=Prior×Likelihood

Perceived component is the one that maximizes the posterior:

Posterior($\Omega_{perceived}$)=max(Posterior)(Maximum Posterior Estimation).

For example, the likelihood represents the probability distribution of a facial component feature, which plays the prominent role as identifying people. In summary, the Bayesian learning allows a face to induce sequential movements, which provides the different view points for the component feature in a face, in order to reduce the uncertainty across the likelihood of each facial component feature by taking into account of such facial motion. In our framework, SVM is used for learning to extract the component features from a face. In contrast, Bayesian learning is employed to the temporal correlation of their extracted component features. The PFC-based bidirectional attention network model computes the uncertainty measure used to determine the expectation value of the magnitude of the difference between the true and estimated poses of attention class conditioned on the observation I. Conceputually, our proposed model hypothetically determines the semantic computation of PFC-based bidirectional attention network as it relates to the spatiotemporal computation in order to endanger the top-down signal which is ultimately undertaken by the expectation value. As will be shown later on, our proposed algorithm is capable of extracting indicator component representing the wholeview of face or object, by maximizing the expectant value where attention modulation is taken into account of distinguishing different faces.

4) Image Processing

We present our indicator component-based approach. Training images are captured over the circumstances of various illuminations and the unique (black) background. After the images are collected, pixel values are used as inputs to the component-based learning approach. The SVM training process begins with the face detector extracting the facial component from the whole view of the images. The cropped image is then converted into gray values and is re-scaled to 40×40 pixels. Histogram equalization is also applied to remove variations existing in image brightness and contrast. The 1,600 gray values of each face image are then normalized to the range between 0 and 1. Each image is represented by a single feature vector of length 1,600—the total number of pixels in the image. These feature vectors serve as the inputs to the facial SVM component classifier during the training process.

5) Learning Algorithm

Here, we elucidate the learning algorithm based on the indicator component-based approach of multiple classifiers trained by SVM.

Initialize: posterior probabilities $P^{post}(\Omega_w^c)$ with facial component c and subject's label w. Where $\Omega$ is attention class, which indicates a status for predicting attention modulation across possible facial components.

Image Preprocessing.

Do for t=1, ..., T, t denotes the time of particular facial viewpoint:

1) A training image data set
   $D=(x_1^t, y_1^t), \ldots, (x_n^t, y_n^t)$ with $y_i=1$ (positive) or 0 (negative);
   The positive examples are collected from a single subject whereas the negative examples are collected from rest.

2) Component Learning: each facial component in K-th face is extracted by the SVM learning;

3) Feature Vector: each point x in the input space is mapped to a point $Z=\phi(x)$ of higher dimension space, called the feature space, where the data are separated by the hyperplane as described in FIG. 3.

4) Attention Demanding and Modulation; In our framework, the attention demanding induces to update times of differential view-point of facial images, and that requires the attention modulation around facial components based on MAP estimation Let $\Omega_w^c(t)$ be an attention class where c denotes the index of indicator components in a face and w corresponds to the index of detected subject. Now, we assume that attention class $\Omega_s^c$ can be approximated as follows, $$\Omega_w^c(t) \approx \Sigma_c \alpha_w^c I_w^c(t) \quad (8)$$

where, $I_w^c(t)$ denotes the output from SVM learning, and thus $I_w^c \equiv f(x_w^c)$. $\alpha_w^c$ is the mixing proportion across possible attention class $\Omega_i^c$. It in turn implies about the transition probabilities among the correlative facial components. In our framework, attention modulation is taken account of maximizing the expectation value to extract indicator component. The attention class $\Omega_s^c$ can in turn be learned by the linear combination form of the mixing proportion $\alpha_w^c$ and the $I_w^c$, as shown in Koshizen, T., Akatsuka, K. and Tsujino, H., "A computational model of attentive visual system induced by cortical neural network", Vol. 44-46C, pp. 879-885, which is incorporated by reference herein in its entirety. Furthermore, we assume Eq. (6) can be approximated by the nonlinear function g: Therefore, attention class $\Omega_i^c$ can be described as (for the discrete-time case), $$\hat{I}_w^c(t+1) = g(I_w^c(t), \Omega_w^c(t)) \quad (9)$$

In accordance with the mathematical result obtained by Koshizen, T. and Fulcher, J. (1995), "An application of Hamiltonian neurodynamics using Pontryagin?fs Maximum (Minimum) principle", International Journal of Neural Systems, Vol. 6, Num. 4, pp. 425~434, which is incorporated by reference herein in its entirety, the function g: R↦R, acts as an activation function, which was defined by sigmoidal nonlinear function. Note that the sigmoid function is equivalent to assuming that the output of the SVM is proportional to the log odds of a positive examples.

$$g(I_w^c, \Omega_w^c) \approx \frac{1}{1 + \exp(I_w^c)} = P(\Omega_w^c | I_w^c) \quad (10)$$

Figure 8:
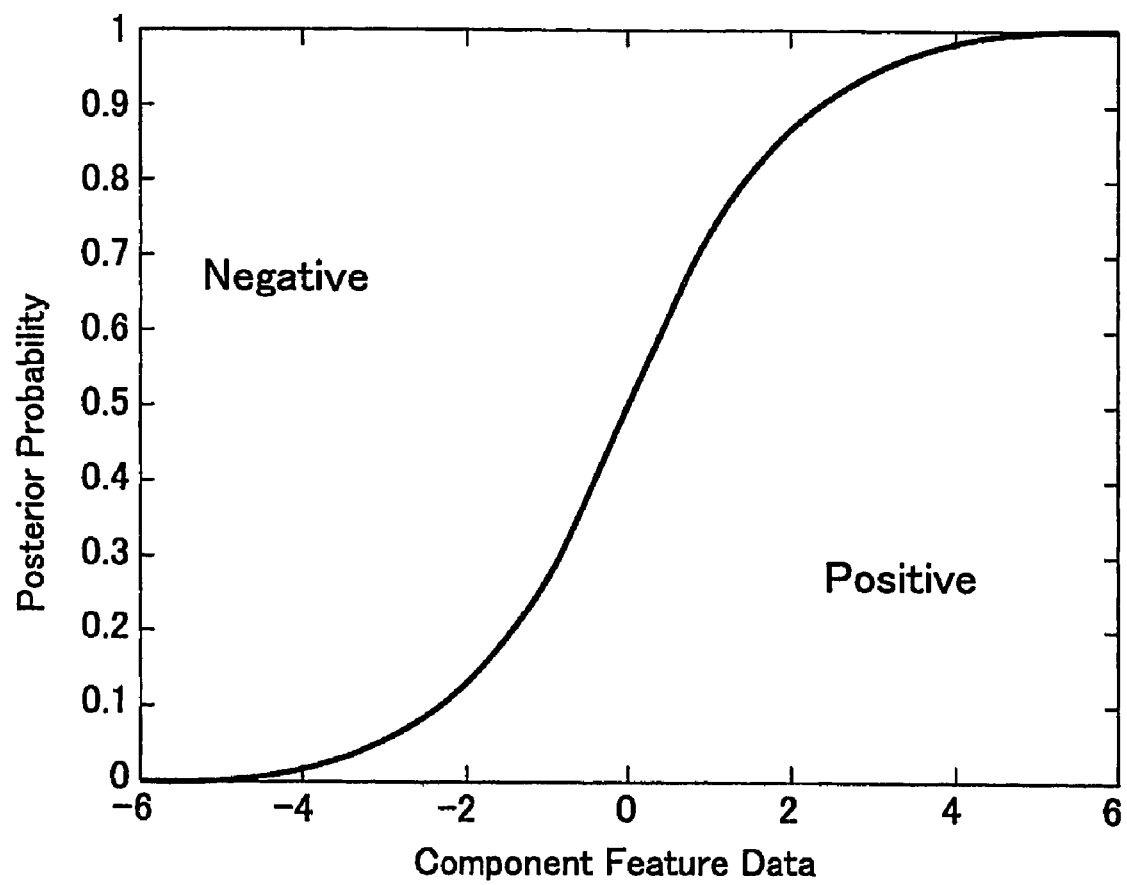
FIG. 8 shows the sigmoidal function of posterior probability $P(y=1|f)$ (0 in the horizontal axis represents the optimal hyperplane across features related to facial components.

The posterior probability $P(\Omega_w^c | I_w^c)$, whose slope is the tied variance in Eq. (8). In principle, it allows us to calculate the conditional 17 probability $P(I_w^c | \Omega_w^c)$. Normally, it requires the conditional probability to be parameterized based on density estimation technique, for instance EM algorithm, see Dempster, A., Laird, N. and Rubin, D. (1977), "Maximum likelihood from incomplete data via the EM algorithm", Journal of the Royal Statistical Society, Series B, Vol. 39, Nov. 39, pp. 1-39, which is incorporated by reference herein in its entirety. The Bayesian computation usually requires the probabilistic representation as described in FIG. 6, and it may be well-fitted to represent the column's representation [21]. However, the Bayesian computation usually needs a large number of examples to estimate the model parameter, which is impractical for image retrieval because it can not always be guaranteed to gather many positive and negative examples for training SVs. FIG. 8 shows the posterior probability P (y=1|f) of positive examples whose shape has the sigmoidal function represented by FIG. 8. Instead, we decided to use learning techniques that are nonparametric and do not need a large number of examples to learn a decision boundary. Vapnik suggested a method for mapping the output of SVMS to probabilities by decomposing the feature space f into a direction orthogonal to the separating hyperplane, and all of the N−1 other dimensions of the feature space. That is, Wahba previously allowed the outputs from the kernel function K to be the posterior probability that is identical to the sigmoidal function, see Wahba, G. (1999), "Support vector machines, reproducing kernel hilbert spaces and the randomized GACV', In B. Scholkopf, C. J. C. Burges, and A. J. Smola, editors, Advances in Kernel Methods—Support Vector Learning, pages 69-88., Cambridge, Mass., 1999. MIT Press, which is incorporated by reference herein in its entirety. Let the unthresholded output of an SVM be Eq. (2), then it lies in a reproducing Kernel Hilbert Space (RKHS) F induced by a kernel k. Eventually, Eq. (9) is obtained by minimizing a negative log multinominal likelihood plus a term that penalizes the norm in an RKHS:

$$-\frac{1}{m}\sum_i \left(\frac{y_i+1}{2}\log(P_i) + \frac{1-y_i}{2}\log(1-P_i)\right) + \lambda\|h\|_F^2 \quad (11)$$

where $P_i=P(x_i)$. The output $P(-)$ of such a machine will be a posterior probability. Minimizing the error function given by Eq. (11) will not directly produce a sparse machine, but a modification to this method can produce sparse kernel, see Wahba (referenced above).

Generally, the posterior probability P (y=1|f) allow f to be monotonic, since the SVM is trained to separate most or all of the positive examples from the negative examples.

5) Biological EM algorithm; In our framework, attention demanding process is arised based on the maximum expectation $\epsilon(\Omega_w^c)$ value of attention modulation where the posterior probability of attention class $\Omega_w^c$ is used to predict the possible transition paths among their classes. The mathematical description of the expectative log-likelihood is provided as follows, $$\epsilon(\Omega_w^c) = \int \log P(I_w^c, \Omega_w^c; t) dI \quad (12)$$

Where, t indicates the certain time where face is orientated with a facial viewpoint.

Let $P(\Omega(t))$ in the mathematical form given (8) be modified as follow, $$P'(\Omega(t)) = \frac{1}{1+\exp(I(t)/\gamma(t))} \quad (13)$$

where, $\gamma(t)$ denotes the amplitude of attention classes $\Omega(t)$ given by the posterior probability $P(\Omega(t))$ that is calculated by modulating the face viewpoint spontaneously, in order to obtain the satisfactory outcome of SVM training with respect to maximize the expectation value in Eq. (12). Theoretically, $\gamma(t)$ should be calculated by the following mathematical formula, $$\gamma(t) = \frac{\partial \epsilon(\Omega(t))}{\partial \Omega(t)} \quad (14)$$

EM can be derived in many different ways, one of the most insightful being in terms of lower bound maximization (see Dempster (referenced above) and Neal, R. and Hinton, G. (1998), "A view of the EM algorithm that justifies incremental, sparse, and other variants", In Jordan, M., editor, Learning in Graphical Models. Kluwer Academic Publishers, which are incorporated by reference herein in their entirety). To goal is to maximize the posterior probability of given outputs I(t), in the presence of hidden variable $\Omega$. Equivalently, we can maximize the logarithm of the joint distribution (which is proportional to the posterior):

$$\Omega(t+1) = \arg\max \Omega(t) \epsilon(\Omega, \Omega(t)) \quad (15)$$

Logothetis has showed the orientation indicate smooth interpolation properties of the underlying representation using monkey experiments, which characterize the view-variance of the responses of neurons in area IT of the macaque, see 27. Logothetis, N. K., Pauls, J., and Poggio, T. (1995), "Shape representation in the inferior temporal cortex of monkeys", Current Biology, Vol 5., pp. 552-563 which is incorporated by reference herein in its entirety.

The EM algorithm of the present invention performs the following step as follows, Expectation (E): calculate Expectation given by Eq. (12).
Maximization (M): calculate $\Omega(t+1)$ given by Eq. (13).

$\epsilon(\Omega(t))$ is calculated in the E-step by evaluating the current guess $\Omega(t)$ (hence the superscript t), where in the M-step we are optimizing $\epsilon(\Omega,\Omega(t))$ with respect to the free variable t to accordingly obtain the new estimate $\Omega(t+1)$. In practice, the free variables may be obtained by the cross-validation.

6) Face detection; eventually, indicator facial components are used for face detection, as well as distinguishing a single subject from the rest. This is eventually attained throughout the spatial component learning step (2) plus the temporal component learning step (5). The most advantage of the indicator component-based approach is to abstract from a single feature vector consisting of all components decomposed by a face, using the SVM component learning scheme as shown in FIG. 4.

Experiments

There are two goals for our experiments. The first goal is to evaluate training performance of spatial component learning statistically, when the viewpoints of a face are fluctuated and animated; the second is to compare the estimation performance of the attention modulation among different facial components, cascaded by temporal component learning in accordance with the spatial component learning.

In order to generate the inputs to the proposed system we normalized each of the components in size and combined their gray values into a single feature vector. The spatial component learning to extract the components from a facial image, a set of 12 facial components arrange them in a single feature vector, though, before extracting their components from a facial image we applied the same processing steps to the detected 40×40 face in]ages in the system.

Successively, the temporal learning process is undertaken by following after the spatial learning process, in order to train the relationship among associative components. In our framework, this process is implemented by a statistical learning scheme. Attention class of possible orientated components can basically be attained based on Eq. (11). Bayesian formula is employed for computing posterior probability derived from prior probability of P ($\Omega(t)|I(t)$) where $\Omega(t)$ is the output that is obtained by the spatial learning phase for extracting each SVM components from a face.

Figure 9:
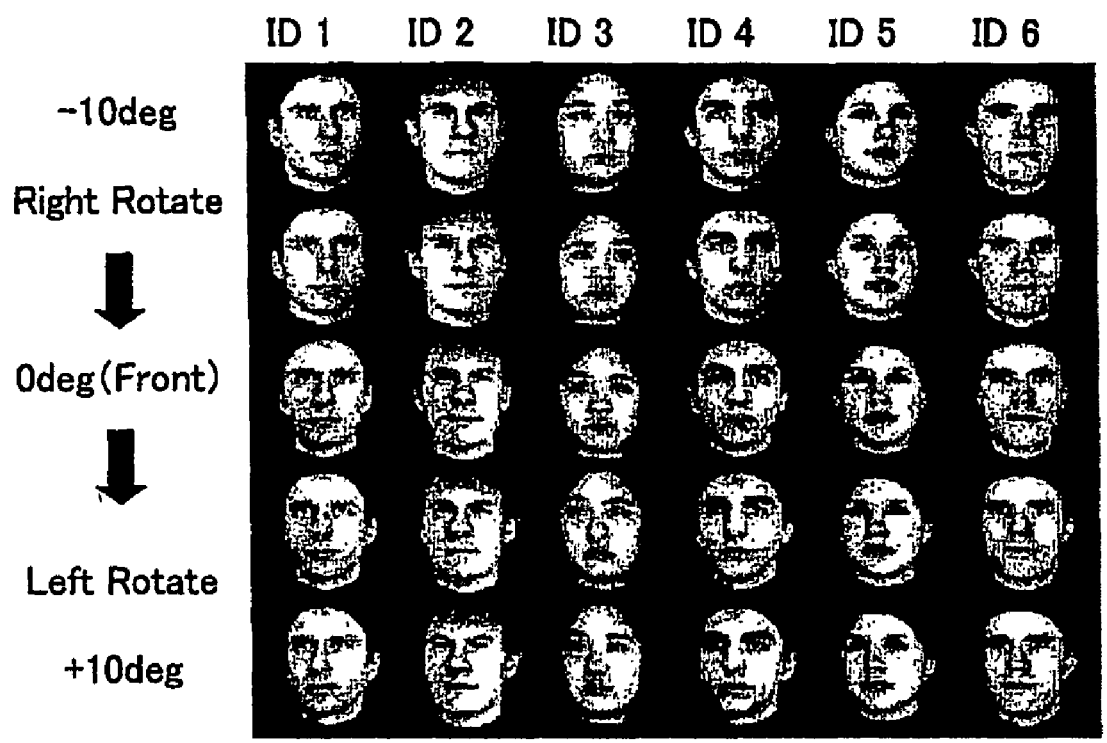
FIG. 9 shows Case I of facial movement pattern in which the facial viewpoint has the rotation by right to left, or left to right within $-10°$ to $+10°$.
Figure 10:
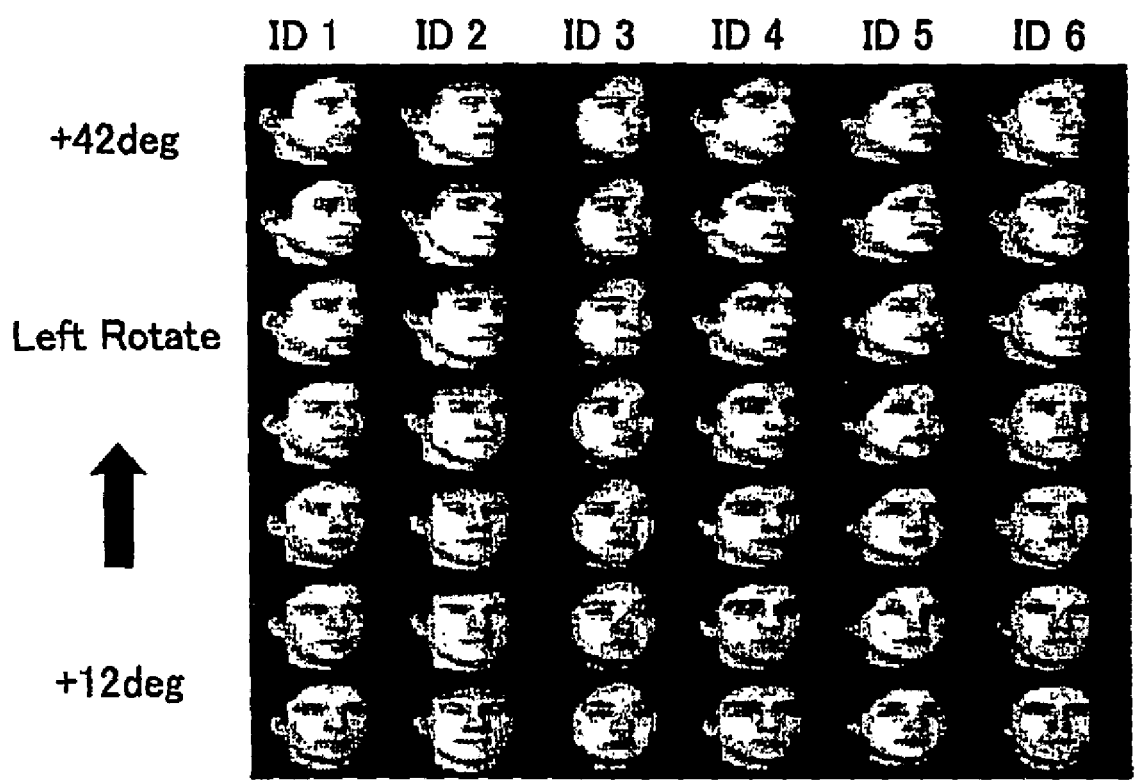
FIG. 10 shows Case 2 of facial movement pattern in which the facial viewpoint has the rotation by left alone within $+12°$ to $+42°$.

With respect to the training dataset, it includes 974 images of all six subjects. They also contain the frontal and profile faces for all subjects. The rotations in depth are again up to about ±42°. FIG. 9, 10 shows the facial patterns for 6 subject where all faces are rotated/animated in left and right sides by even 2°. It is presumed the orientation of face is centered as the frontal viewpoint as 0°.

In our experiment, we train on all 8,593 rotated and frontal face images in the training set.

Figure 11:
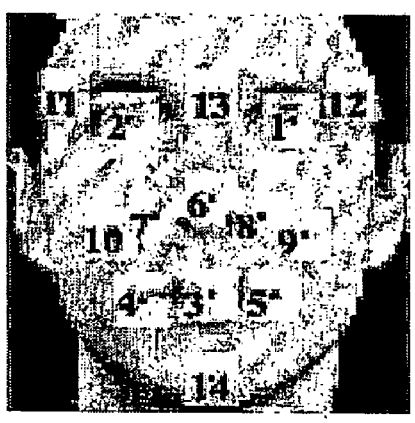
FIG. 11 shows detection of 12 component locations in face.
Figure 11:
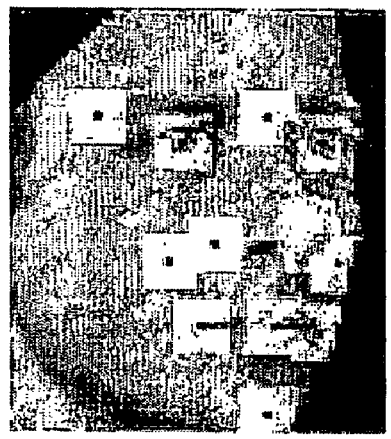

FIG. 11 shows the component locations that are assigned by the attention class. They are calculated by the face component-based detection.

Figure 12:
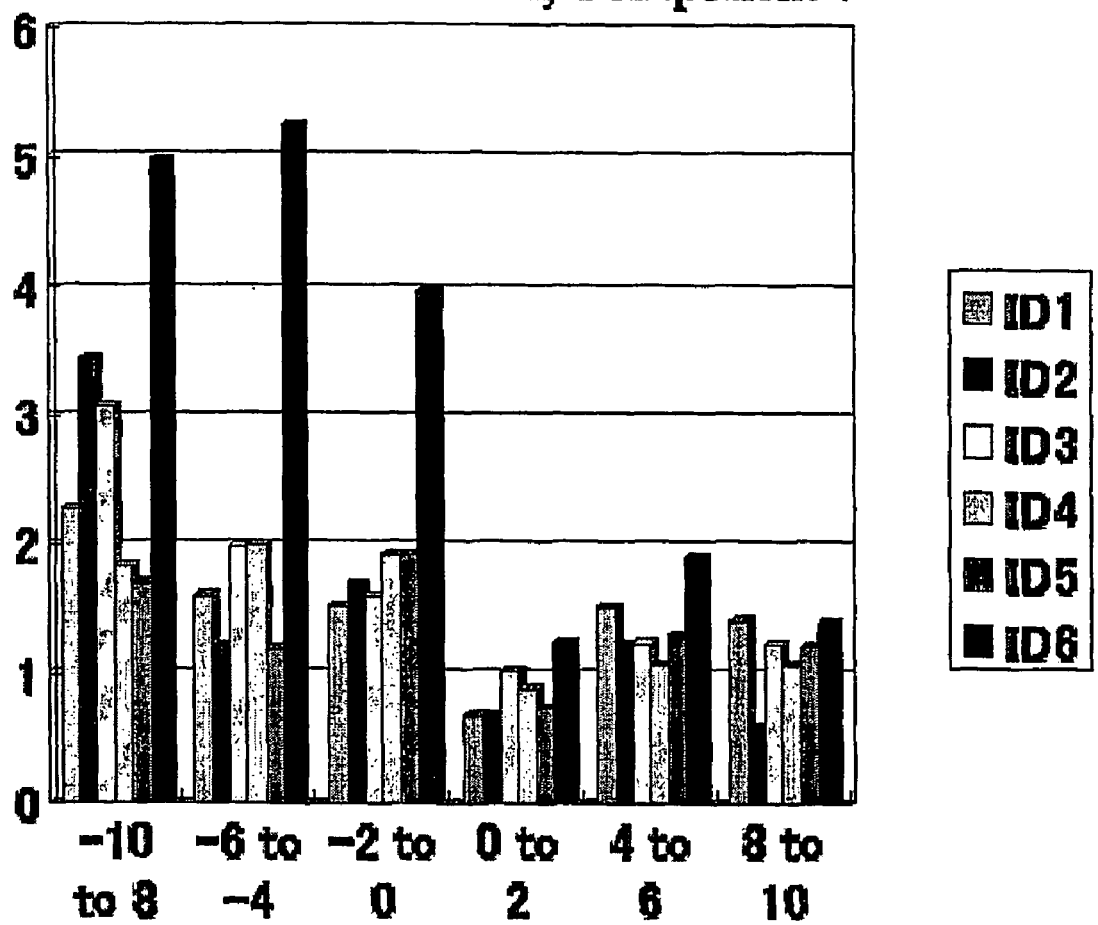
FIG. 12 shows the histograms that are computed by SVM learning algorithm, the vertical line representing the learning result (margin) of the right side nose and the horizontal line showing the relevant viewpoints where the face is rotated over $-10°$ to $+10°$ degree.
Figure 13:
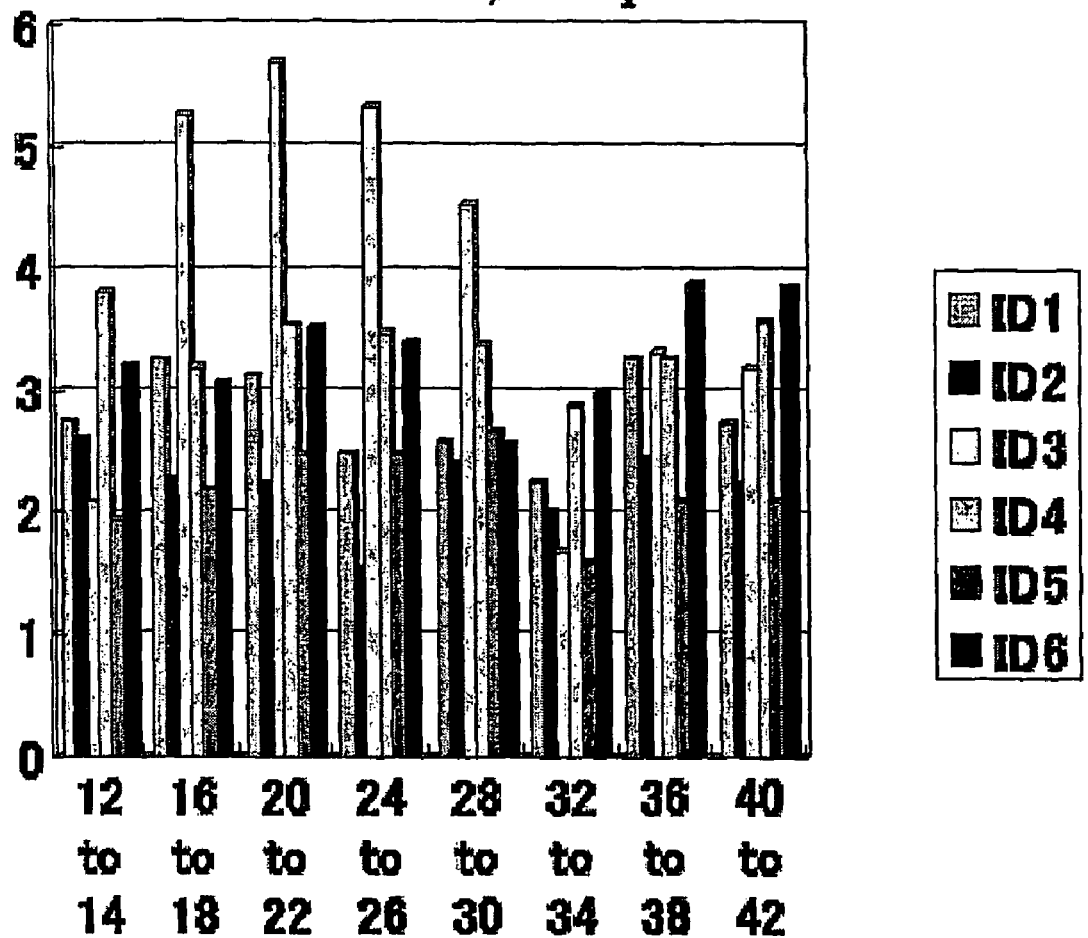
FIG. 13 shows the histograms that are computed by SVM learning algorithm, the vertical line representing the learning result (margin) of the left edge of mouth and the horizontal line showing the relevant viewpoints where the face is rotated over $+12°$ to $+42°$ degree.

FIGS. 12 and 13 describes the histograms that are computed by SVM learning algorithm. FIG. 12 represents the learning result (margin) of the right side nose as indicated in the vertical line. By contrast, the horizontal line shows the relevant viewpoints where the face is rotated over −10° to +10° degree (Case 1). Obviously, the subject ID-6 is the most distinctiveness in relation to the categorization to the negative examples. Note that in this case, the negative examples are composed of the rest (namely ID-1, ID-2, ID-3, ID4 and ID-5). In the same way, FIG. 13 is the result of the SVM learning across the left edge of mouth that is obtained where the face is rotated over +12° to +42° degree (Case 2). The result apparently indicates that the subject ID-3 can be the most distinctiveness to the negative examples.

Figure 14:
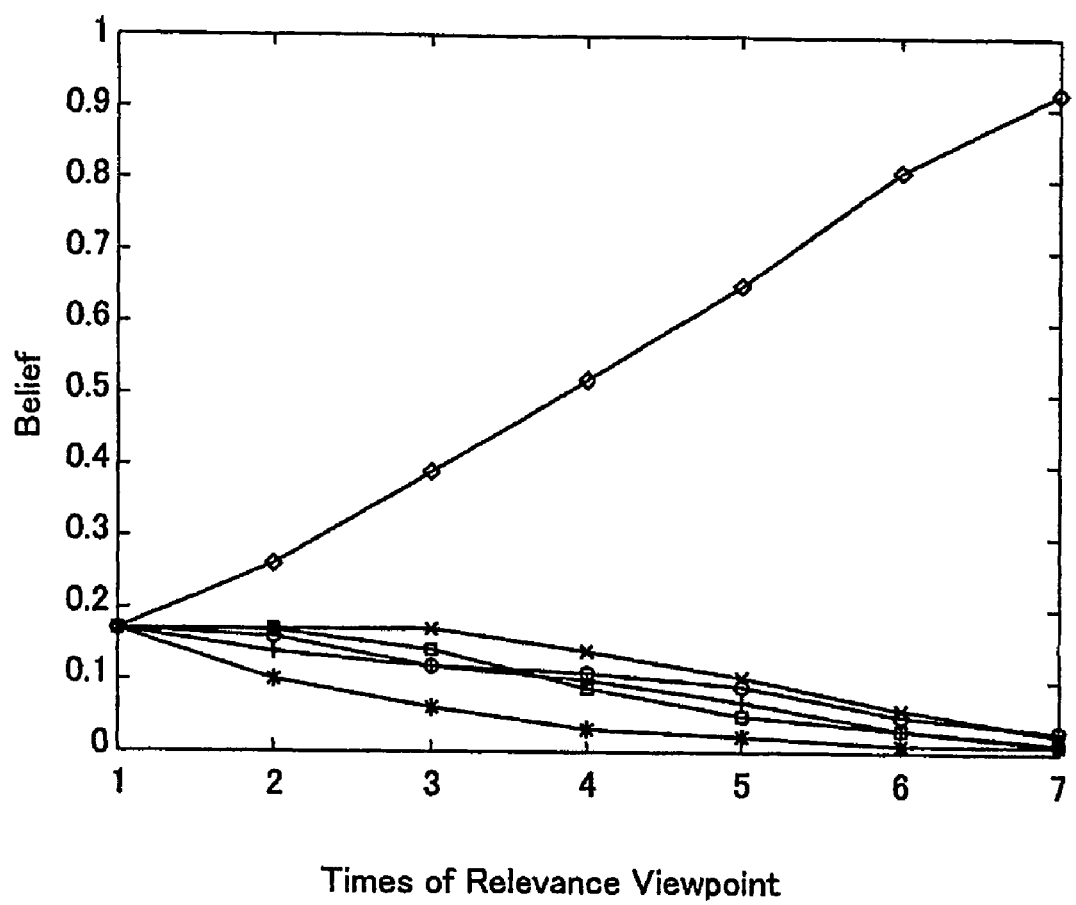
FIG. 14 shows posterior probabilities of possible attention classes where the indicator component corresponds to the left eye.
Figure 15:
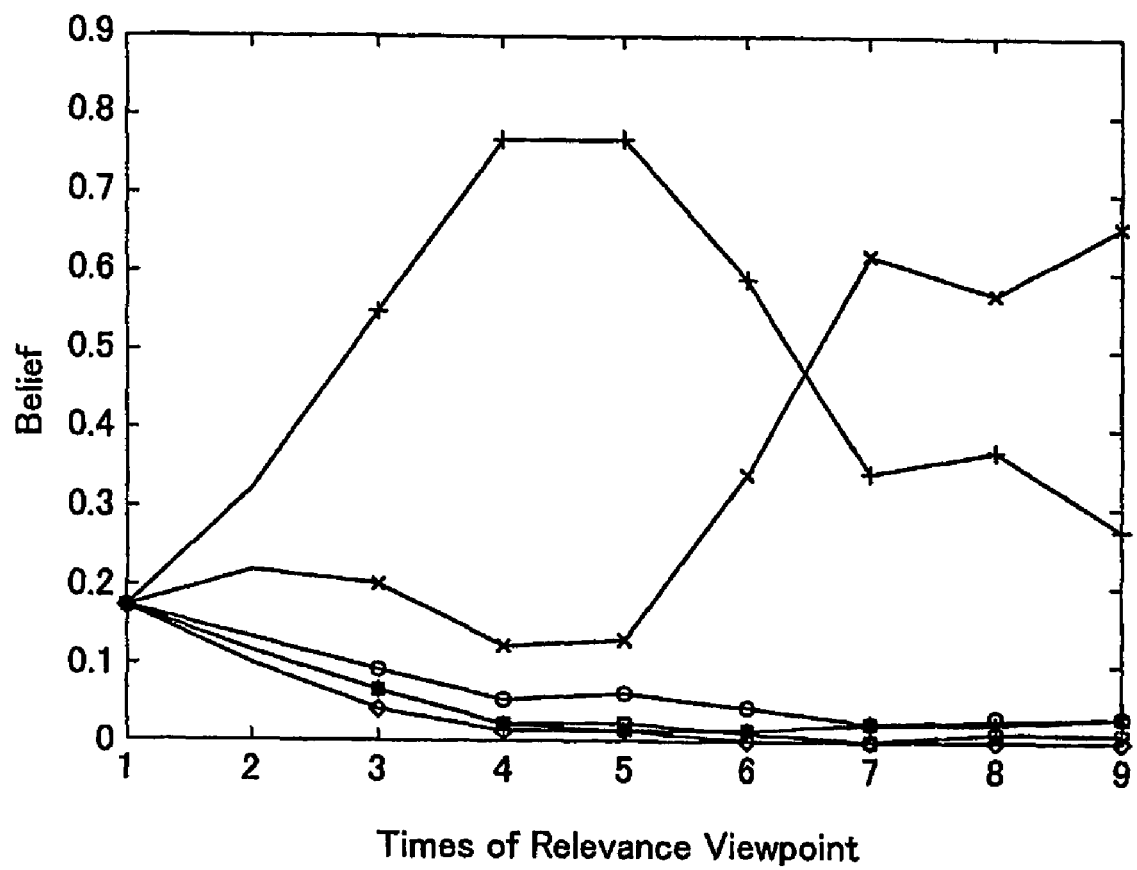
FIG. 15 shows posterior probabilities of possible attention classes where the indicator component corresponds to the right cheek.
Figure 16:
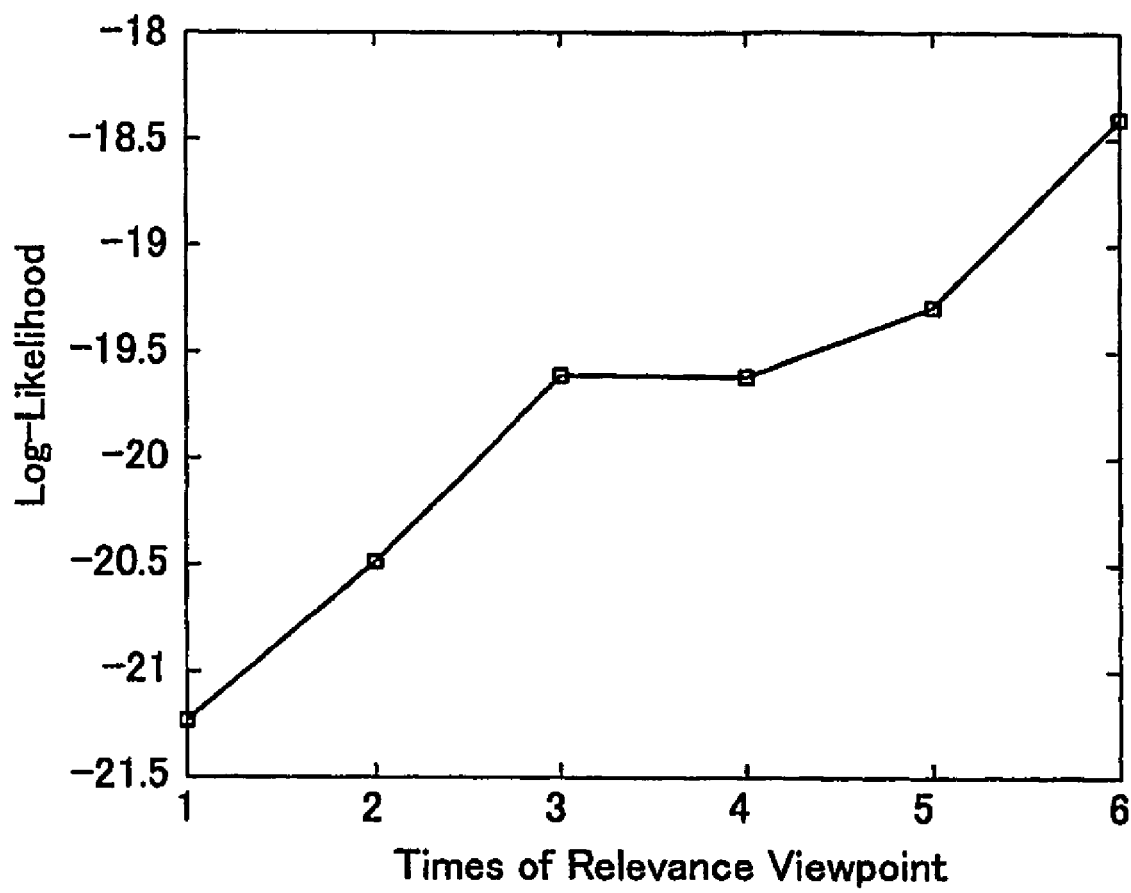
FIG. 16 shows an expectation value calculated by a posterior probability shown in FIG. 14.
Figure 17:
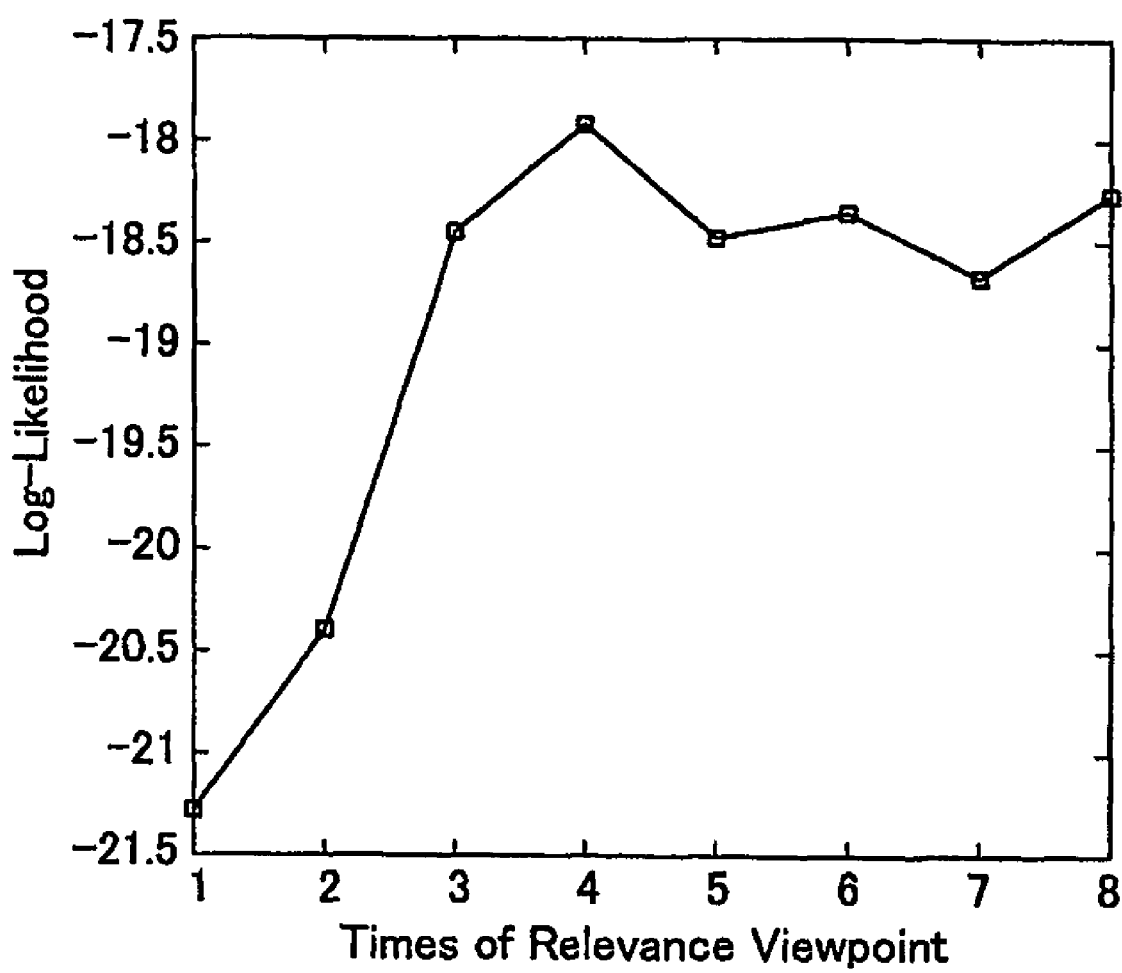
FIG. 17 shows an expectation value calculated by a posterior probability shown in FIG. 15.

Here, their distinctive components are called indicator components. Furthermore, FIGS. 14 and 15 shows the posterior probability of their indicator components, which are updated with the prior probability whenever the face is rotated with certain viewpoint. Note that the indicator component of FIG. 14 corresponds to the left eye of ID-3 whereas that of FIG. 15 is the right cheek of ID-6. Additionally, FIGS. 16 and 17 shows the expectation values that are calculated by the posterior probability. The expectation value implies which of attention class should be directed in order to attain the generalization ability of indicator components of positive example. Where, □=ID-1, o=ID-2, ◊=ID-3, +=ID-4, *=ID-5, x=ID-6.

What is claimed is:

1. A method for recognizing faces of persons, comprising:
    training a system to recognize a facial component;
    populating a first knowledge base with facial components and, for each facial component, the facial component's body part classification, wherein the facial components in the first knowledge base include a first set of facial components extracted from facial identification training image data of a face of a first person at a first set of viewpoints;
    determining a first set of body part classifications associated with the first set of facial components;
    for each body part classification in the first set of body part classifications:
        determining, from the first set of facial components, a subset of facial components that are associated with the body part classification, wherein the facial components in the subset represent a same body part classification of a same person at multiple viewpoints; and
        determining a probability that a person class of the subset of facial components is the first person; and
    determining a first body part classification in the first set of body part classifications that maximizes the probability.

2. The method of claim 1, wherein the facial components in the first knowledge base further include a second set of facial components extracted from facial identification training image data of a face of a second person at a second set of viewpoints, and wherein the method further comprises:
    determining a second set of body part classifications associated with the second set of facial components;
    for each body part classification in the second set of body part classifications:
        determining, from the second set of facial components, a subset of facial components that are associated with the body part classification; and
        determining a probability that a person class of the subset of facial components is the second person; and
    determining a second body part classification in the second set of body part classifications that maximizes the probability.

3. The method of claim 2, wherein the first body part classification and the second body part classification are different.

4. The method of claim 2, wherein the first set of viewpoints and the second set of viewpoints are different.

5. The method of claim 1, wherein determining the probability comprises determining the probability using Bayesian estimation.

6. The method of claim 1, wherein determining the probability that the person class of the subset of facial components is the first person comprises:
    determining a first conditional probability, that a class is the first person, of a facial component of the subset of facial components at a first viewpoint;
    determining a first posterior probability, that a class is the first person, by multiplying the conditional probability at the first viewpoint by a prior probability, that a class is the first person;
    determining a second conditional probability, that a class is the first person, of a facial component of the subset of facial components at an additional viewpoint; and
    determining a second posterior probability, that a class is the first person, by multiplying the second conditional probability by the first posterior probability.

7. The method of claim 6, wherein the prior probability, that the class is the first person, comprises one Nth where N is a number of person classes.

8. The method of claim 1, further comprising storing, in a second knowledge base, the facial components in the first set of facial components that are associated with the first body part classification.

9. The method of claim 8, further comprising:
    receiving facial components at various viewpoints of a person to be identified; and
    identifying the person using a facial component stored in the second knowledge base.

10. The method of claim 1, wherein training the system to recognize the facial component comprises:
    receiving facial component training image data of faces of persons at various viewpoints;
    extracting facial components at various viewpoints from the facial component training image data of faces of persons at various viewpoints; and
    training a body part classifier module using the extracted facial components.

11. The method of claim 10, wherein the body part classifier module performs one-versus-all classification.

12. A system for recognizing faces of persons, comprising:
    a training module configured to train a facial component recognition system to recognize a facial component;
    a population module configured to populate a first knowledge base with facial components and, for each facial component, the facial component's body part classification, wherein the facial components in the first knowledge base include a first set of facial components extracted from facial identification training image data of a face of a first person at a first set of viewpoints;
    a computer readable storage medium storing an indicator component module configured to:
        determine a first set of body part classifications associated with the first set of facial components;
        for each body part classification in the first set of body part classifications:
            determine, from the first set of facial components, a subset of facial components that are associated with the body part classification, wherein the facial components in the subset represent a same body part classification of a same person at multiple viewpoints; and determine a probability that a person class of the subset of facial components is the first person; and determine a first body part classification in the first set of body part classifications that maximizes the probability; and a processor configured to execute the indicator component module stored by the computer readable storage medium.

13. The system of claim 12, wherein the facial components in the first knowledge base further include a second set of facial components extracted from facial identification training image data of a face of a second person at a second set of viewpoints, and wherein the indicator component module is further configured to:

determine a second set of body part classifications associated with the second set of facial components;

for each body part classification in the second set of body part classifications:

determine, from the second set of facial components, a subset of facial components that are associated with the body part classification; and determine a probability that a person class of the subset of facial components is the second person; and determine a second body part classification in the second set of body part classifications that maximizes the probability.

14. The system of claim 13, wherein the first body part classification and the second body part classification are different.

15. The system of claim 13, wherein the first set of viewpoints and the second set of viewpoints are different.

16. The system of claim 12, wherein the indicator component module is further configured to determine the probability using Bayesian estimation.

17. The system of claim 12, wherein the indicator component module is further configured to determine the probability that the person class of the subset of facial components is the first person by:

determining a first conditional probability, that a class is the first person, of a facial component of the subset of facial components at a first viewpoint;

determining a first posterior probability, that a class is the first person, by multiplying the conditional probability at the first viewpoint by a prior probability, that a class is the first person;

determining a second conditional probability, that a class is the first person, of a facial component of the subset of facial components at an additional viewpoint; and determining a second posterior probability, that a class is the first person, by multiplying the second conditional probability by the first posterior probability.

18. The system of claim 17, wherein the prior probability, that the class is the first person, comprises one Nth where N is a number of person classes.

19. The system of claim 12, further comprising a storage module configured to store, in a second knowledge base, the facial components in the first set of facial components that are associated with the first body part classification.

20. The system of claim 19, further comprising:

a receiving module configured to receive facial components at various viewpoints of a person to be identified; and an identification module configured to identify the person using a facial component stored in the second knowledge base.

21. The system of claim 12, wherein the training module is further configured to:

receive facial component training image data of faces of persons at various viewpoints;

extract facial components at various viewpoints from the facial component training image data of faces of persons at various viewpoints; and train a body part classifier module using the extracted facial components.

22. The system of claim 21, wherein the body part classifier module performs one-versus-all classification.

* * * * *